United States Patent
Zhang et al.

(10) Patent No.: US 10,609,664 B2
(45) Date of Patent: Mar. 31, 2020

(54) TECHNIQUES AND APPARATUSES FOR FREQUENCY DIVISION MULTIPLEXING (FDM) BASED MEDIUM ACCESS ON SHARED SPECTRUM

(71) Applicant: QUALCOMM Incorporated, San Diego, CA (US)

(72) Inventors: Xiaoxia Zhang, San Diego, CA (US); Taesang Yoo, Riverside, CA (US); Siddhartha Mallik, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/617,277

(22) Filed: Jun. 8, 2017

(65) Prior Publication Data

US 2018/0132198 A1 May 10, 2018

Related U.S. Application Data

(60) Provisional application No. 62/417,562, filed on Nov. 4, 2016.

(51) Int. Cl.
*H04W 56/00* (2009.01)
*H04W 16/14* (2009.01)
(Continued)

(52) U.S. Cl.
CPC ......... *H04W 56/001* (2013.01); *H04W 16/14* (2013.01); *H04W 72/0453* (2013.01); *H04W 74/0816* (2013.01)

(58) Field of Classification Search
CPC . H04W 56/01; H04W 16/14; H04W 72/0453; H04W 74/0816; H04W 74/0808;
(Continued)

(56) References Cited

U.S. PATENT DOCUMENTS 8,233,462 B2 * 7/2012 Walton ............. H04W 74/0808
370/338
9,420,472 B2 * 8/2016 Chen .................... H04W 16/14
(Continued)

FOREIGN PATENT DOCUMENTS

EP 2151954 A1 2/2010

OTHER PUBLICATIONS

International Search Report and Written Opinion—PCT/US2017/055368—ISA/EPO—dated Jan. 18, 2018.

*Primary Examiner* — Benjamin H Elliott, IV
*Assistant Examiner* — Nevena Zecevic Sandhu
(74) *Attorney, Agent, or Firm* — Harrity & Harrity, LLP

(57) ABSTRACT

A network operator may synchronize access for wireless nodes (e.g., base stations) associated with the network operator. However, each network operator of a group of network operators may not synchronize access among the group. A lack of synchronization between network operators intending to utilize shared channels of a wireless communication system may result in a failure to utilize all available network resources. In some aspects, a device associated with a first network operator, of a plurality of network operators, may listen for communications associated with other network operators, of the plurality of network operators in a shared radio frequency spectrum band, during a set of intervals of a transmission opportunity of a channel for which the other network operators have a higher priority, and may communicate, using the channel, with a wireless
(Continued)

node associated with the network operator based at least in part on the listening for communications.

29 Claims, 17 Drawing Sheets

(51) Int. Cl.
*H04W 72/04* (2009.01)
*H04W 74/08* (2009.01)

(58) Field of Classification Search
CPC ... H04W 84/12; H04W 5/14; H04W 72/0493; H04W 5/0032; H04L 41/12
See application file for complete search history.

(56) References Cited

U.S. PATENT DOCUMENTS

| | | | |
|---|---|---|---|
| 9,749,872 B2* | 8/2017 | Zhu | H04W 16/14 |
| 2012/0120887 A1* | 5/2012 | Deaton | H04W 16/14 |
| | | | 370/329 |
| 2014/0206377 A1 | 7/2014 | Priotti | |
| 2014/0307701 A1 | 10/2014 | Markwart et al. | |
| 2015/0092758 A1* | 4/2015 | Chen | H04W 16/14 |
| | | | 370/336 |
| 2015/0281974 A1* | 10/2015 | Ghasemzadeh | H04W 16/14 |
| | | | 455/454 |
| 2016/0021664 A1* | 1/2016 | Chou | H04W 52/0229 |
| | | | 370/329 |
| 2016/0212625 A1 | 7/2016 | Damnjanovic et al. | |
| 2016/0366689 A1 | 12/2016 | Zhang et al. | |
| 2017/0019347 A1 | 1/2017 | Al-Banna et al. | |

\* cited by examiner

TECHNIQUES AND APPARATUSES FOR FREQUENCY DIVISION MULTIPLEXING (FDM) BASED MEDIUM ACCESS ON SHARED SPECTRUM

CROSS-REFERENCE TO RELATED APPLICATION UNDER 35 U.S.C. § 119

This application claims priority to U.S. Provisional Patent Application No. 62/417,562 filed on Nov. 4, 2016 entitled "TECHNIQUES AND APPARATUSES FOR FREQUENCY DIVISION MULTIPLEXING (FDM) BASED MEDIUM ACCESS ON SHARED SPECTRUM," which is incorporated by reference herein.

FIELD OF THE DISCLOSURE

The following relates generally to wireless communication, and more particularly to techniques and apparatuses for frequency division multiplexing (FDM) based medium access on shared spectrum.

BACKGROUND

Wireless communications systems are widely deployed to provide various types of communication content, such as voice, video, packet data, messaging, broadcast, and/or the like. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, a new radio shared spectrum (NR-SS) system, and/or the like). A wireless multiple-access communications system may include a number of base stations, each simultaneously supporting communication for multiple wireless communication devices, which may be otherwise known as user equipment (UEs).

A wireless communications system may operate over shared spectrum, meaning that the wireless communications system includes one or more frequency bands that may be shared by multiple network operators (e.g., multiple network operating entities). In some instances, sharing of the frequency bands may include subdividing the frequency bands into ever-smaller bands dedicated for use by specific network operators. In other instances, at least portions of band spectrum may be available for use by more than one network operator.

A network operator may synchronize access for wireless nodes (e.g., base stations) associated with the network operator. However, each network operator of a group of network operators may not synchronize access among the group. For example, a first network operator may utilize a first timing for utilization of a first channel and a second network operator may utilize a second timing for utilization of a second channel. Use of the available band spectrum may be subject to a contention procedure that may involve the use of a medium-sensing procedure. For example, to avoid interference between different devices operated by different network operators, the wireless communications system may employ medium-sensing procedures, such as listen-before-talk (LBT), to ensure a particular channel is clear before transmitting a message. A lack of synchronization between network operators intending to utilize shared channels of a wireless communication system may result in a failure to utilize all available network resources. Accordingly, improved procedures for allocating and using shared spectrum between network operators are desirable.

SUMMARY

The described techniques provide for assigning resources of a wireless communications system to permit partially synchronized access to a group of network operators within a shared spectrum. Assigning resources may include assigning priorities for use of each channel to each network operator. For example, a network operator may be assigned a priority for a set of channels, such as a highest priority for exclusive use of a channel, a lower priority for opportunistic use of a channel, and/or the like, and may determine to use a particular channel based at least in part on a priority of the network operator relative to one or more other priorities of one or more other network operators. By allocating priority in this way to each network operator, multiple network operators may efficiently communicate over shared spectrum while reducing interference and signaling overhead.

In an aspect of the disclosure, a method, a device, an apparatus, and a computer program product are provided.

In some aspects, the method of wireless communications by a device associated with a first network operator, of a plurality of network operators, may include identifying a first channel of a plurality of channels, the plurality of channels being shared by the plurality of network operators in a shared radio frequency spectrum band, wherein the first network operator has priority to use the first channel over a second network operator of the plurality of network operators. The method may include identifying a second channel of the plurality of channels, wherein the second network operator has priority to use the second channel over the first network operator. The method may include listening for communications corresponding to a preamble, a request to send (RTS)/clear to send (CTS) exchange, or energy associated with one or more other network operators, of the plurality of network operators, during a set of intervals of a transmission opportunity (TXOP) of the second channel. The method may include communicating, using the second channel, with a wireless node associated with the first network operator based at least in part on the listening for communications.

In some aspects, the device may be associated with a first network operator, of a plurality of network operators, and may include a memory and one or more processors coupled to the memory. The memory and the one or more processors may be configured to identify a first channel of a plurality of channels, the plurality of channels being shared by the plurality of network operators in a shared radio frequency spectrum band, wherein the first network operator has priority to use the first channel over a second network operator of the plurality of network operators. The memory and the one or more processors may be configured to identify a second channel of the plurality of channels, wherein the second network operator has priority to use the second channel over the first network operator. The memory and the one or more processors may be configured to listen for communications corresponding to a preamble, an RTS/CTS exchange, or energy associated with one or more other network operators, of the plurality of network operators, during a set of intervals of a TXOP of the second channel. The memory and the one or more processors may be configured to communicate, using the second channel, with a wireless node associated with the first network operator based at least in part on the listening for communications.

In some aspects, the apparatus may be associated with a first network operator, of a plurality of network operators, and may include means for identifying a first channel of a plurality of channels, the plurality of channels being shared by the plurality of network operators in a shared radio frequency spectrum band, wherein the first network operator has priority to use the first channel over a second network operator of the plurality of network operators. The apparatus may include means for identifying a second channel of the plurality of channels, wherein the second network operator has priority to use the second channel over the first network operator. The apparatus may include means for listening for communications corresponding to a preamble, an RTS/CTS exchange, or energy associated with one or more other network operators, of the plurality of network operators, during a set of intervals of a TXOP of the second channel. The apparatus may include means for communicating, using the second channel, with a wireless node associated with the first network operator based at least in part on the listening for communications.

In some aspects, the computer program product may include a non-transitory computer-readable medium storing one or more instructions for wireless communication that, when executed by one or more processors of a device associated with a first network operator, of a plurality of network operators, cause the one or more processors to identify a first channel of a plurality of channels, the plurality of channels being shared by the plurality of network operators in a shared radio frequency spectrum band, wherein the first network operator has priority to use the first channel over a second network operator of the plurality of network operators. The one or more instructions may cause the one or more processors to identify a second channel of the plurality of channels, wherein the second network operator has priority to use the second channel over the first network operator. The one or more instructions may cause the one or more processors to listen for communications corresponding to a preamble, an RTS/CTS exchange, or energy associated with one or more other network operators, of the plurality of network operators, during a set of intervals of a TXOP of the second channel. The one or more instructions may cause the one or more processors to communicate, using the second channel, with a wireless node associated with the first network operator based at least in part on the listening for communications.

DETAILED DESCRIPTION

Wireless communications systems operated by different network operators (e.g., network operating entities) may share spectrum. Although each network operator of a group of network operators may synchronize access to resources of the wireless communications systems (e.g., the shared spectrum) among respective groups of wireless nodes, the group of network operators may or may not synchronize access between the groups. For example, a first network operator may include a group of wireless nodes utilizing a first timing and a second network operator may include a group of wireless nodes utilizing a second timing. Thus, in order to allow network operators use of the full designated shared spectrum, and in order to mitigate interfering communications between the different network operators, certain resources (e.g., channels) may be prioritized for the different network operators for certain types of communication.

For example, a first network operator may be allocated, for a first channel, a priority that is greater than for a second network operator, and may be allocated, for a second channel, a priority that is lower than for the second network operator. The first network operator may use the first channel during a particular transmission opportunity (TXOP) without waiting for confirmation that the second network operator is intending to use the second channel. The first network operator may opportunistically use the second channel during the particular TXOP based at least in part on the second network operator not using the second channel or not signaling an intent to use the second channel. For example, the first network operator may use the second channel after listening for communications (e.g., a preamble, a request to send (RTS)/clear to send (CTS) exchange, energy, and/or the like) associated with one or more other network operators and based at least in part on the listening.

Access to the shared spectrum and the prioritization for channel resources among different network operators may be centrally controlled by a separate entity, autonomously determined by a predefined arbitration scheme, or dynamically determined based at least in part on interactions between wireless nodes (e.g., base stations or base station controllers) of the network operators.

It is noted that while aspects may be described herein using terminology commonly associated with 3G and/or 4G wireless technologies, aspects of the present disclosure can be applied in other generation-based communication systems, such as 5G and later, including New Radio (NR) technologies (e.g., a New Radio (NR) shared spectrum (SS) system (SS-NR)).

Figure 1:
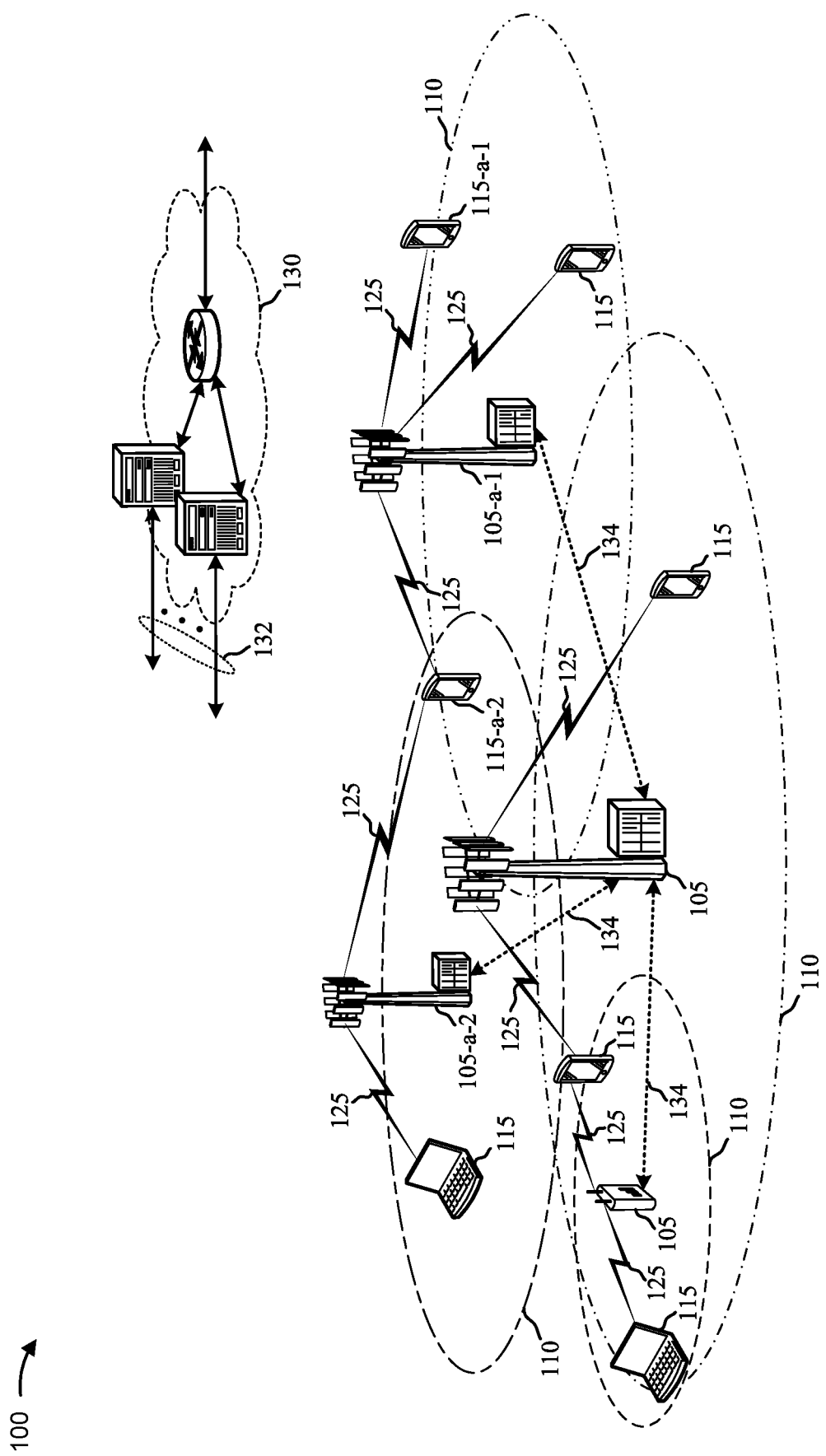
FIG. 1 illustrates an example of a system for wireless communication that supports partially synchronized access in accordance with aspects of the present disclosure.

FIG. 1 illustrates an example of a wireless communications system 100 in accordance with various aspects of the present disclosure. The wireless communications system 100 includes base stations 105 located in geographic coverage areas 110, user equipment (UEs) 115 that connect to base stations 105 via communication links 125, and a core network 130. In some examples, the wireless communications system 100 operates over a shared spectrum. The shared spectrum may be unlicensed or partially licensed to one or more network operators. Access to the spectrum may be limited and may be controlled by a separate coordination entity. In some examples, the wireless communications system 100 may be a Long Term Evolution (LTE) or LTE-Advanced network. In yet other examples, the wireless communications system 100 may be a millimeter wave (mmW) system, an NR-SS system, a 5G system, or any other successor system to LTE. The wireless communications system 100 may be operated by more than one network operator. Wireless resources may be partitioned and arbitrated among the different network operators for coordinated communication between the network operators over the wireless communications system 100.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, a wearable device, and/or the like.

Base stations 105 may communicate with the core network 130 and with one another. Core network 130 may provide user authentication, access authorization, tracking, Internet Protocol (IP) connectivity, and other access, routing, or mobility functions. At least some of the base stations 105 (e.g., which may be an example of an evolved NodeB (eNB), an NR next generation node B (gNB), or an access node controller (ANC)) may interface with the core network 130 through backhaul links 132 (e.g., an S1 link, an S2 link, etc.) and may perform radio configuration and scheduling for communication with the UEs 115. In various examples, the base stations 105 may communicate, either directly or indirectly (e.g., through core network 130), with each other over backhaul links 134 (e.g., an X1 link, an X2 link, etc.), which may be wired or wireless communication links.

Each base station 105 may also communicate with a number of UEs 115 through a number of other base stations 105, where base station 105 may be an example of a smart radio head. In alternative configurations, various functions of each base station 105 may be distributed across various base stations 105 (e.g., radio heads and access network controllers) or consolidated into a single base station 105.

In some cases, UE 115 and base station 105 may operate in a shared radio frequency spectrum band, which may include licensed or unlicensed frequency spectrum. In an unlicensed frequency portion of the shared radio frequency spectrum band, UEs 115 or base stations 105 may perform a medium-sensing procedure to contend for access to the frequency spectrum, such as to communicate using at least one of a group of channels. For example, UE 115 or base station 105 may perform a listen before talk (LBT) procedure, such as a clear channel assessment (CCA), prior to communicating in order to determine whether a shared channel is available. A CCA may include an energy detection procedure to determine whether there are any other active transmissions. For example, a device may infer that a change in a received signal strength indicator (RSSI) of a power meter indicates that a channel is occupied for a particular TXOP. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. Additionally, or alternatively, a first other device may transmit a request to send (RTS) message and a second other device may respond by transmitting a clear to send (CTS) message. In this case, based at least in part on detecting the RTS message, the CTS message, or a combination thereof, a device may determine that the first other device and the second other device intend to use the channel or are using the channel. In some cases, an LBT procedure may include a wireless node adjusting a backoff window based at least in part on the amount of energy detected on a channel and/or acknowledge/negative-acknowledge (ACK/NACK) feedback for packets that the wireless node transmits as a proxy for collisions.

In wireless communications system 100, base stations 105 and UEs 115 may be associated with the same or different network operators. In some examples, an individual base station 105 or UE 115 may be associated with more than one network operator. In other examples, each base station 105 and UE 115 may be operated by a single network operator. When each base station 105 and UE 115 of different network operators contend for shared resources but lack timing synchronization, utilization of network resources (e.g., channels) may be inefficient. For example, a channel may fail to be utilized during a transmission opportunity as a result of a base station 105 and/or a UE 115 failing to determine that the channel is not being utilized by another network operator. Moreover, a medium-sensing procedure may result in a network operator failing to obtain a threshold level of network resources necessary for operation, resulting in poor network performance. For example, a particular network operator may fail to receive any network resources (e.g., any channels) for utilization.

Accordingly, in some examples, wireless communications system 100 is operated by multiple network operators, and the different network operators may share wireless spectrum (e.g., unlicensed spectrum). In accordance with aspects of the present disclosure, a priority for use of the resources (e.g., channels) shared between the network operators may be allocated to each network operator to facilitate coordinated communications. For example, in wireless communications system 100, base station 105-*a*-1 may communicate with UE 115-*a*-1, which may both be associated with a common network operator. Base station 105-*a*-2 may communicate with UE 115-*a*-2, which may both similarly be associated with a different common network operator. By channel partitioning (e.g., frequency-partitioning) the shared spectrum according to network operators, the communications between base station 105-*a*-1 and UE 115-*a*-1 and the communications between base station 105-*a*-2 and UE 115-*a*-2 may each occur on respective portions of the shared spectrum. To do so, and as more fully explained below, certain resources (e.g., channels) may be allocated to the different network operators based at least in part on an assigned priority of the different network operators for the certain resources.

In some examples, a base station 105 or an entity of the core network 130 may act as a central arbitrator to manage access and coordinate the prioritization of resources among different network operators operating within the wireless communications system 100. The central arbitrator may include a spectrum access system (SAS), in some examples.

As indicated above, FIG. 1 is provided merely as an example. Other examples are possible and may differ from what was described with regard to FIG. 1.

Figure 2:
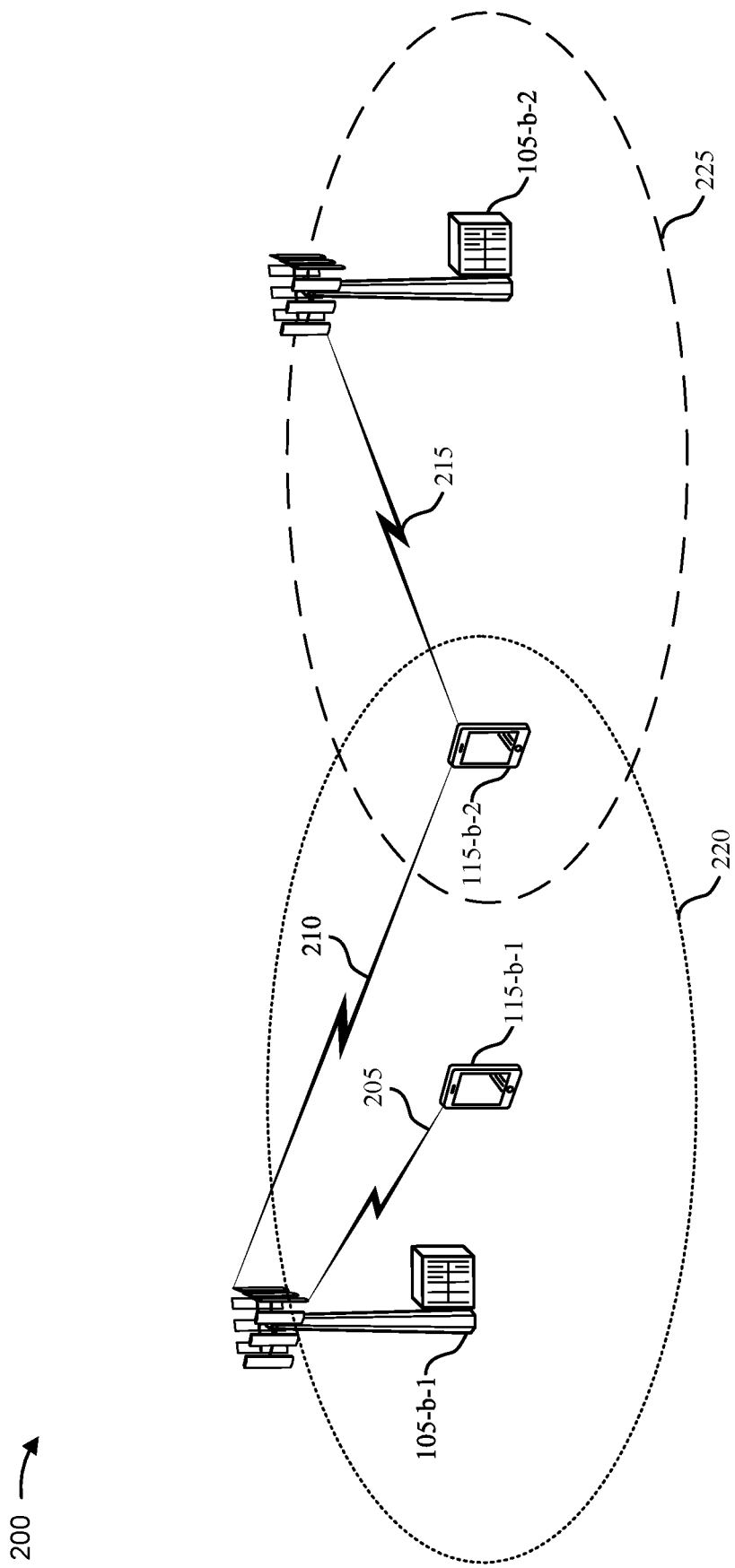
FIG. 2 illustrates an example of a system for wireless communication that supports partially synchronized access in accordance with aspects of the present disclosure.

FIG. 2 illustrates an example of a wireless communications system 200 that supports partially synchronized access. Wireless communications system 200 may include a base station 105-*b*-1, a base station 105-*b*-2, a UE 115-*b*-1, and a UE 115-*b*-2, which may be examples of the corresponding devices described with reference to FIG. 1. Base station 105-*b*-1 and base station 105-*b*-2 may communicate with UEs 115 or other wireless devices via communication links 205, 210, and/or 215 and within their respective coverage areas 220 and 225, as described herein. In some examples, wireless communications system 200 is operated by multiple network operators, and the different network operators may share wireless spectrum (e.g., unlicensed spectrum). In accordance with aspects of the present disclosure, the resources (e.g., channels) shared between the network operators may be prioritized among the network operators to facilitate partially synchronized access.

In some aspects, base station 105-*b*-1 may be operated by one or more network operators. For example, base station 105-*b*-1 may be operated by a first network operator to communicate with UE 115-*b*-1 via communication link 205, and base station 105-*b*-1 may be operated by a second network operator to communicate with UE 115-*b*-2 via communication link 210. As described in more detail below, the coordination at base station 105-*b*-1 of communications between UE 115-*b*-1 and UE 115-*b*-2 may be based at least in part on a prioritization of the first and second network operators for a set of channels shared between the first and second network operators.

Base station 105-*b*-2 may also be operated by one or more network operators. In some examples, base station 105-*b*-2 is operated by a third network operator to communicate with UE 115-*b*-2 via communication link 215. In this example, UE 115-*b*-2 may be configured to operate with both the second and third network operators. The coordination at UE 115-*b*-2 of communications between base station 105-*b*-1 and base station 105-*b*-2 may be based at least in part on a prioritization for the second and third network operators for the set of channels.

The shared spectrum used by wireless communications system 200 may be efficiently used by employing a prioritization scheme between the multiple network operators. For example, the shared spectrum may be partitioned into a set of channels corresponding to a set of frequency bands and priorities may be assigned to different network operators for use of the set of channels. In some examples, a particular network operator may be assigned a particular channel as a primary channel. In this case, the particular network operator may have exclusive use of the channel for a first acquisition interval of time (e.g., an A-INT) and prioritized use of the channel for a second guaranteed interval of time (e.g., a G-INT). In this case, the particular network operator may access the channel without contention during the first interval of time and/or the second interval of time. Other channels may be assigned as secondary channels for the particular network operator (and as primary channels for other network operators). In this case, the particular network operator may use a secondary channel during a third opportunistic interval of time (e.g., an O-INT, which may correspond to a G-INT for another network operator that is a primary network operator for the channel) if other network operators with a higher priority for the channel fail to use the channel or signal an intent to use the channel during the third interval of time.

Access to the wireless communications system 200, the prioritization and allocation of the resources, and/or the synchronization of the network operators may be controlled by a central coordinator (e.g., a SAS). In some examples, the prioritization and classification of resources may be autonomously determined based at least in part on the number of network operators. Synchronization between the network operators may occur explicitly through centralized signaling. Additionally, or alternatively, the network operators may employ a self-synchronization scheme based at least in part on "network-listening" where the wireless nodes, such as base stations 105, UEs 115, and/or the like, from different network operators listen to each other and determine a timing synchronization accordingly. Additionally, or alternatively, the network operators may operate without synchronization, based at least in part on using gap periods in transmissions to detect signaling by other network operators, as described herein.

As indicated above, FIG. 2 is provided merely as an example. Other examples are possible and may differ from what was described with regard to FIG. 2.

Figure 3:
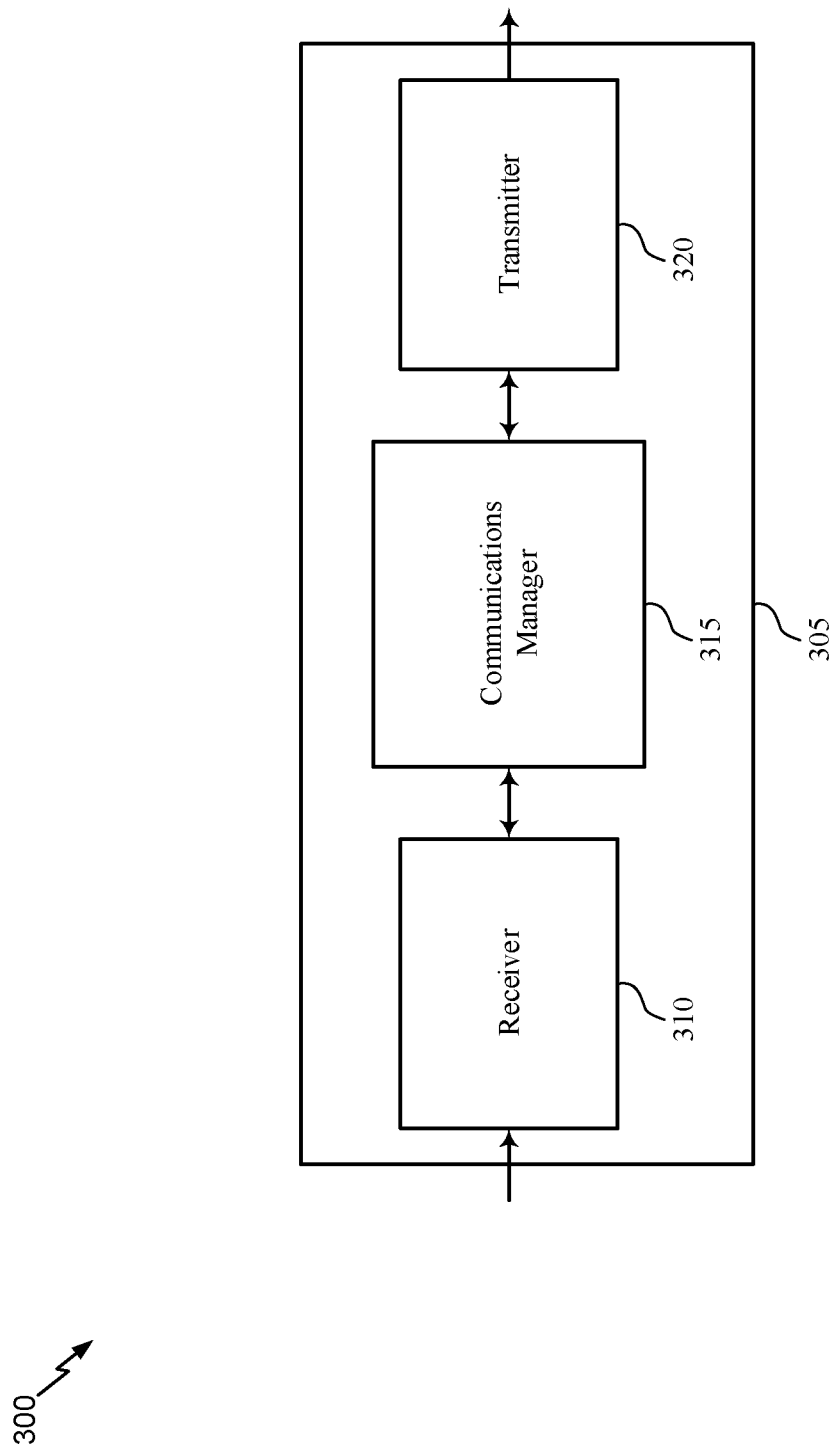
FIG. 3 illustrates a block diagram of a device that supports partially synchronized access in accordance with aspects of the present disclosure.

FIG. 3 shows a block diagram 300 of a wireless device 305 that uses frequency division multiplexing (FDM) for medium access and supports medium sharing with fully or partially synchronized network operators in accordance with various aspects of the present disclosure. Wireless device 305 may be an example of aspects of a user equipment (UE) 115 or base station 105 as described with reference to FIG. 1. Wireless device 305 may include receiver 310, communications manager 315, and transmitter 320. Wireless device 305 may also include a processor. Each of these components may be in communication with one another (e.g., via one or more buses).

Receiver 310 may receive information such as packets, user data, or control information associated with various information channels (e.g., control channels, data channels, and information related to prioritization of channel access, etc.). Information may be passed on to other components of wireless device 305. The receiver 310 may be an example of aspects of the transceiver 635 described with reference to FIG. 6, transceiver 735 described with reference to FIG. 7, and/or the like.

Communications manager 315 may be an example of aspects of UE communications manager 615 described with reference to FIG. 6, base station communications manager 715 described with reference to FIG. 7, and/or the like.

Communications manager 315 may identify a plurality of channels in a shared radio frequency spectrum band shared by a plurality of network operators; identify a first channel of the plurality of channels, where a first network operator, of the plurality of network operators, has priority to use the first channel over a second network operator of the plurality of network operators; identify a second channel of the plurality of channels, where the second network operator has priority to use the second channel over the first network operator; and communicate, using at least one of the first channel or the second channel, with a wireless node associated with the first network operator.

Transmitter 320 may transmit signals generated by other components of the device. In some examples, the transmitter 320 may be collocated with a receiver 310 in a transceiver module. For example, the transmitter 320 may be an example of aspects of the transceiver 635 described with reference to FIG. 6, transceiver 735 described with reference to FIG. 7, and/or the like. The transmitter 320 may include a single antenna, or transmitter 320 may include a plurality of antennas.

As indicated above, FIG. 3 is provided merely as an example. Other examples are possible and may differ from what was described with regard to FIG. 3.

Figure 4:
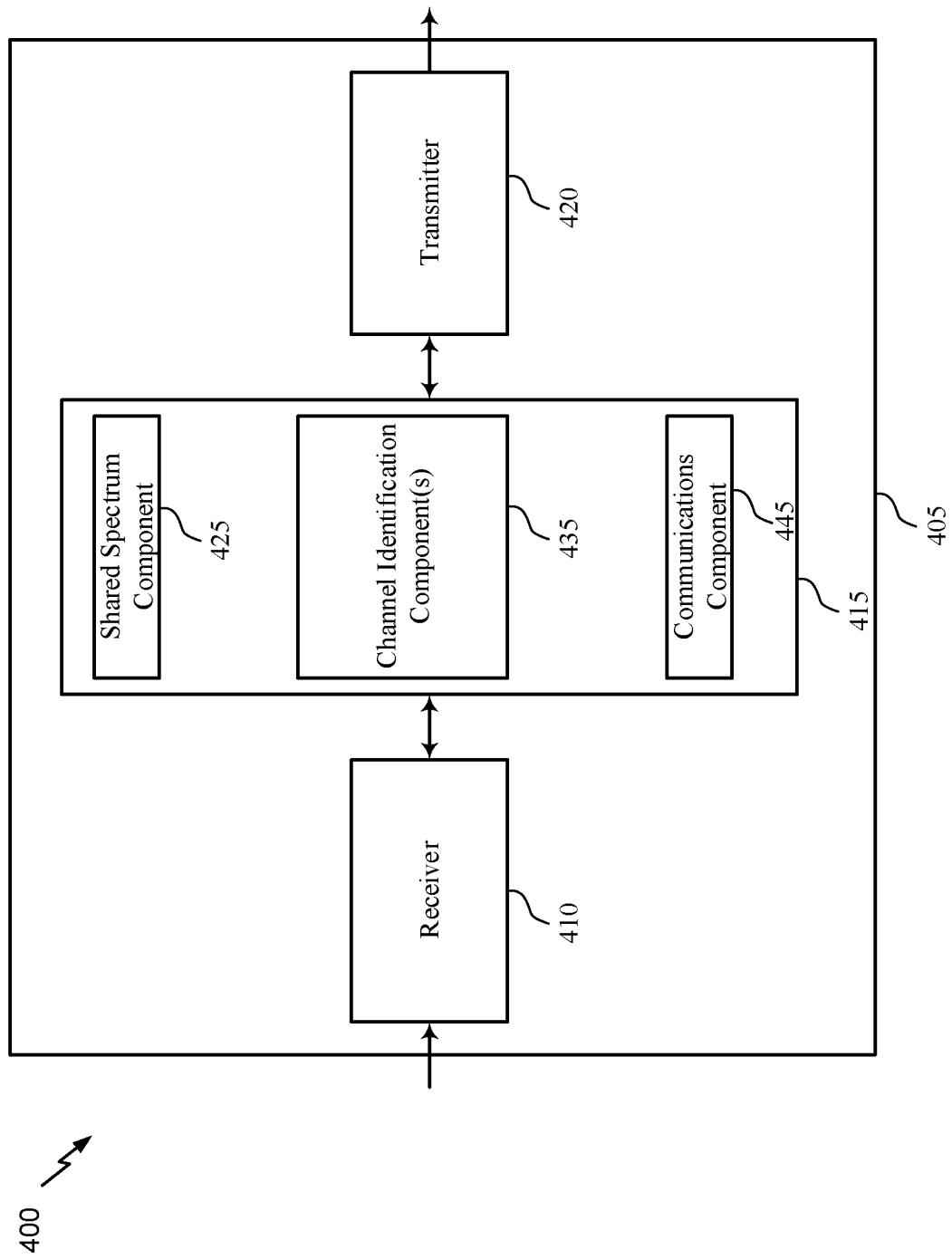
FIG. 4 illustrates a block diagram of a device that supports partially synchronized access in accordance with aspects of the present disclosure.

FIG. 4 shows a block diagram 400 of a wireless device 405 that uses FDM for medium access and supports medium sharing with fully or partially synchronized network operators in accordance with various aspects of the present disclosure. Wireless device 405 may be an example of aspects of a wireless device 305 or a UE 115 or base station 105 as described with reference to FIGS. 1-3. Wireless device 405 may include receiver 410, communications manager 415, and transmitter 420. Wireless device 405 may also include a processor. Each of the components of wireless device 405 may be in communication with other components of wireless device 405 (e.g., via one or more buses).

Receiver 410 may receive information such as packets, user data, or control information associated with various information channels (e.g., control channels, data channels, and information related to prioritization of channel access, etc.). Receiver 410 may pass the information on to other components of wireless device 405. Receiver 410 may be an example of aspects of the transceiver 635 described with reference to FIG. 6, transceiver 735 described with reference to FIG. 7, and/or the like.

Communications manager 415 may be an example of aspects of UE communications manager 615 described with reference to FIG. 6, base station communications manager 715 described with reference to FIG. 7, and/or the like.

Communications manager 415 may also include shared spectrum component 425, channel identification component 435, and communications component 445.

Shared spectrum component 425 may identify a set of channels in a shared radio frequency spectrum band shared by a set of network operators.

Channel identification component 435 may identify a first channel in the set of channels for use by a network operator, a second channel in the set of channels for use by the network operator, and/or the like. The first channel may be a channel for which the network operator has priority to use the channel over another network operator. For example, channel identification component 435 may identify a channel that is allocated as a primary channel to the network operator and for which the network operator has acquisition interval (A-INT) use and guaranteed interval (G-INT) use (e.g., a highest priority level for use relative to other network operators). The second channel may be a channel for which another network operator has priority to use the channel over the network operator. For example, channel identification component 435 may identify a channel that is allocated as a secondary channel to the network operator and for which the network operator has opportunistic interval (O-INT) use (e.g., the network operator may utilize the channel when higher priority network operators do not use or indicate an intent to use the channel). Channel identification component 435 may listen for communications during a set of TXOPs of the second channel to identify a preamble, an RTS/CTS exchange, energy, and/or the like associated with one or more other network operators (e.g., network operators associated with a higher priority for the second channel than the network operator associated with wireless device 405), and may determine that the second channel is available for communication based at least in part on the listening for communications.

Communications component 445 may communicate, using at least one of the set of channels (e.g., the first channel or the second channel), with a wireless node associated with the network operator. For example, communications component 445 may communicate, using the second channel, with a wireless node associated with the network operator that is associated with wireless device 405. In this case, communication component 445 may provide control information to transmitter 420 to communicate control information with a wireless node (e.g., synchronization information, system information, paging information, random access information, and/or the like). Additionally, or alternatively, communication component 445 may provide data to transmitter 420 to communicate data using at least one of the set of channels.

Transmitter 420 may transmit signals generated by other components of wireless device 405. In some examples, the transmitter 420 may be collocated with a receiver 410 in a transceiver module. For example, the transmitter 420 may be an example of aspects of the transceiver 635 described with reference to FIG. 6, transceiver 735 described with reference to FIG. 7, and/or the like. The transmitter 420 may include a single antenna, or transmitter 420 may include a plurality of antennas.

As indicated above, FIG. 4 is provided merely as an example. Other examples are possible and may differ from what was described with regard to FIG. 4.

Figure 5:
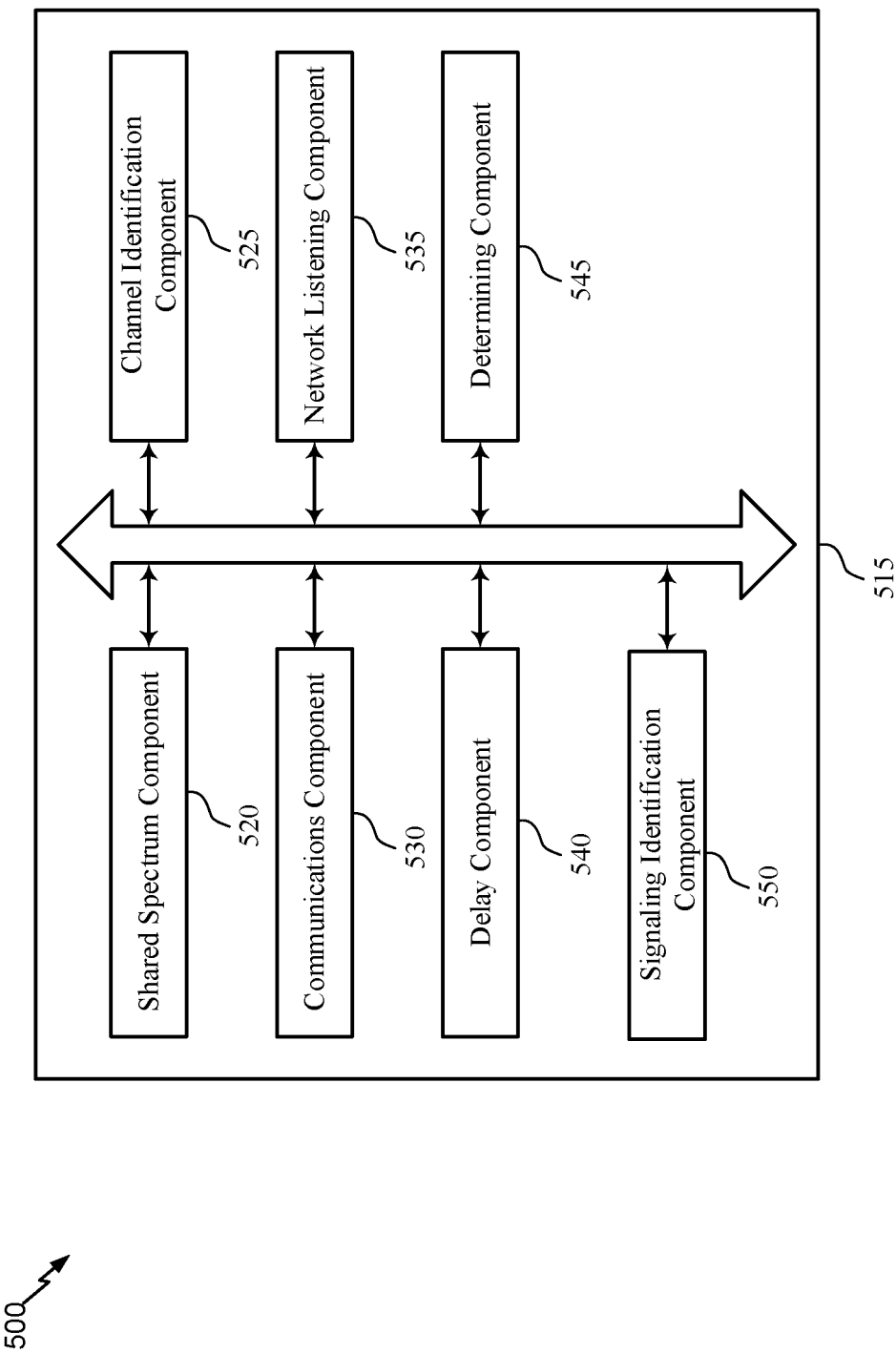
FIG. 5 illustrates a block diagram of a device that supports partially synchronized access in accordance with aspects of the present disclosure.

FIG. 5 shows a block diagram 500 of a communications manager 515 that uses FDM for medium access and supports medium sharing with fully or partially synchronized network operators in accordance with various aspects of the present disclosure. For example, an apparatus may include communications manager 515. The communications manager 515 may be an example of aspects of a communications manager 315, a communications manager 415, or a communications managers 615 or 715 as described with reference to FIGS. 6 and 7, respectively. The communications manager 515 may include shared spectrum component 520, channel identification component 525, communications component 530, network listening component 535, delay component 540, determining component 545, and signaling identification component 550. Each of these components may communicate, directly or indirectly, with one another (e.g., via one or more buses).

Shared spectrum component 520 may identify a set of channels in a shared radio frequency spectrum band shared by a set of network operators.

Channel identification component 525 may identify a first channel in the set of channels for which a first network operator, of the set of network operators, has priority to use the first channel over a second network operator of the set of network operators. The channel identification component 525 may identify a second channel in the set of channels for which the second network operator has priority to use the second channel over the first network operator. In some cases, the first channel may be associated with a first band and the second channel may be associated with a second band that is different from the first band. In some other cases, the first channel and the second channel may be in a common band.

In some aspects, channel identification component 525 may determine that the first network operator is assigned as a highest priority, of a set of priorities for the set of network operators, for the first channel by a network operating entity coordinator, such as a centralized network device and/or the like. For example, communications manager 515 may include a spectrum access coordinator component that may assign the set of priorities for the set of network operators for the first channel or another channel (e.g., the second channel, a third channel, etc.). Additionally, or alternatively, another component of another device may assign the set of priorities for the set of network operators, the set of priorities may be autonomously determined, and/or the like.

Communications component 530 may communicate, using one or more of the set of channels (e.g., the first channel or the second channel), with a wireless node associated with the first network operator. For example, communications component 530 may communicate, using the second channel, with the wireless node associated with the first network operator. Communications component 530 may communicate control information with the wireless node using the one or more of the set of channels, such as synchronization information, system information, paging information, random access information, and/or the like. Communications component 530 may communicate data with the wireless node using the one or more of the set of channels.

Communications component 530 may transmit at a particular interval of the second channel corresponding to the priority, of the set of priorities, of the first network operator for the second channel. For example, after waiting for a set of higher priority network operators to transmit during a set of prior intervals using delay component 540, communications component 530 may communicate at the particular interval. Communication component 530 may transmit on the first channel concurrently with network listening component 535 listening on the second channel, such as when the first channel is associated with a different frequency band than the second channel.

Communications component 530 may communicate an intent to communicate data with the wireless node. For example, based at least in part on determining that the first channel or the second channel is available for communication, communications component 530 may communicate, via the first channel or the second channel, a signal, such as a preamble or an RTS of an RTS/CTS exchange, to indicate an intent to utilize the first channel or the second channel for communication.

In some aspects, communications component 530 may refrain from communicating. For example, after determining that the second channel is unavailable for communication (e.g., based at least in part on identifying signaling), communications component 530 may refrain from communicating using the second channel during a particular period of time. In this case, communications component 530 may communicate using the first channel, may communicate using a third channel, or may refrain from communicating using a channel.

Communications component 530 may indicate to another network operator (e.g., having a lower communication priority than the first network operator, such as the second network operator for the first channel or a third network operator for the second channel) that communication will occur using at least one of the first channel or the second channel. In this case, the other network operator may determine that the at least one of the first channel or the second channel is not available for use. Communications component 530 may indicate to another network operator (e.g., having a lower communication priority than the first network operator, such as the second network operator for the first channel or a third network operator for the second channel) that communication will not occur using at least one of the first channel or the second channel. In this case, the other network operator may determine that the at least one of the first channel or the second channel is available for use.

Network listening component 535 may listen for communications associated with one or more other network operators, of the set of network operators, during a set of time intervals of a transmission opportunity (TXOP), of the second channel. In some aspects, a subset of the set of intervals of the TXOP of the second channel are ordered based at least in part on a set of priorities of the set of network operators for the second channel. For example, a first interval may be reserved for a highest priority network operator to indicate an intent to use the second channel, a second interval may be reserved for a next highest priority network operator to indicate an intent to use the second channel, and/or the like, as described herein. Network listening component 535 may listen for a preamble associated with a communication or a request to send (RTS)/clear to send (CTS) exchange associated with initiating a communication.

Network listening component 535 may listen for communications associated with a subset of other network operators, of the set of network operators, with a higher priority for the second channel than the priority of the first network operator. For example, during a first interval of the set of intervals, network listening component 535 may listen for communications associated a network operator with the highest priority for the second channel. Similarly, during a second interval of the set of intervals, network listening component 535 may listen for communications associated with another network operator with a next highest priority for the second channel. The network listening component 535 may listen for communications while waiting for an interval corresponding to the priority of the first network operator for the second channel. In this way, communications manager 515 may permit the network operator to perform a countdown procedure to identify an interval during which to indicate an intent to utilize the second channel and/or to utilize the second channel.

Network listening component 535 may listen for communications on the second channel concurrently with transmitting on the first channel. For example, when the first channel and the second channel are associated with different bands, network listening component 535 may listen on the different bands concurrently. Network listening component 535 may listen for communications on the second channel during a period when the set of network operators are silent on a subset of channels of the set of channels. For example, when the first channel and the second channel share a common frequency band, each network operator may transmit on a single channel at a time, to permit network listening component 535 to sequentially listen to each channel of the set of channels to determine an availability of each channel for transmission during a particular TXOP. In some aspects, the set of intervals includes a gap period, which may be utilized to listen for communications from another network operator.

Delay component 540 may cause other components of communication manager 515 to perform a waiting procedure. For example, delay component 540 may cause communications manager 515 to wait for the interval corresponding to the priority, of the set of priorities, of the first network operator for the second channel (e.g., during which network listening component 535 may listen for communications associated with one or more other network operators). In some aspects, delay component 540 may include a timer component that may determine a length of the each interval of the set of intervals, and may permit communication manager 515 to determine that a particular interval is complete.

Determining component 545 may determine a timing for the second channel when listening. For example, when network listening component 535 is listening on the second channel, determining component 545 may determine a timing associated with the second channel to synchronize with another network operator associated with the second channel (e.g., the second network operator).

Determining component 545 may determine, based at least in part on receiving data from network listening component 535, an absence of communications from one or more other network operators during the set of intervals of the TXOP of the second channel. For example, determining component 545 may determine that the second network operator failed to communicate during the set of intervals of the TXOP of the second channel during which the second network operator is assigned to communicate, and may determine to communicate during a subsequent set of intervals of the TXOP of the second channel based at least in part on determining the absence of communications.

Determining component 545 may determine, based at least in part on receiving data from network listening component 535, a presence of communications from one or more other network operators during the set of intervals of the TXOP of the second channel. For example, determining component 545 may determine that the second network operator communicated during the set of intervals of the TXOP of the second channel during which the second network operator is assigned to communicate, and may determine to refrain from communicating during a subsequent set of intervals of the TXOP of the second channel based at least in part on determining that the second network operator intends to use the second channel during the TXOP.

Signaling identification component 550 may identify, based at least in part on receiving data from network listening component 535, signaling from another network operator of the one or more other network operators (e.g., the second network operator) with a higher priority for the second channel. In some cases, the signaling may indicate that the other network operator will not use another set of intervals of the TXOP of the second channel for communicating. For example, signaling identification component 550 may determine that the second network operator intends not to use the second channel for communicating during the TXOP. In some other cases, the signaling may indicate that the other network operator (e.g., the second network operator) will use another set of intervals of the TXOP of the second channel for communicating. For example, signaling identification component 550 may identify a preamble or an RTS/CTS exchange associated with the second network operator and may indicate to communications component 530 to refrain from communicating using the second channel during the remainder of the TXOP of the second channel.

Signaling identification component 550 may identify, based at least in part on receiving data from network listening component 535, signaling from another network operator of the one or more other network operators (e.g., the second network operator), with a higher priority for the second channel. The signaling may indicate that the other network operator (e.g., the second network operator) will use another set of intervals of the TXOP of the second channel for communicating. For example, signaling identification component 550 may identify a preamble or an RTS/CTS exchange associated with the second network operator and may indicate to communications component 530 to refrain from communicating using the second channel during the remainder of the TXOP of the second channel.

As indicated above, FIG. 5 is provided merely as an example. Other examples are possible and may differ from what was described with regard to FIG. 5.

Figure 6:
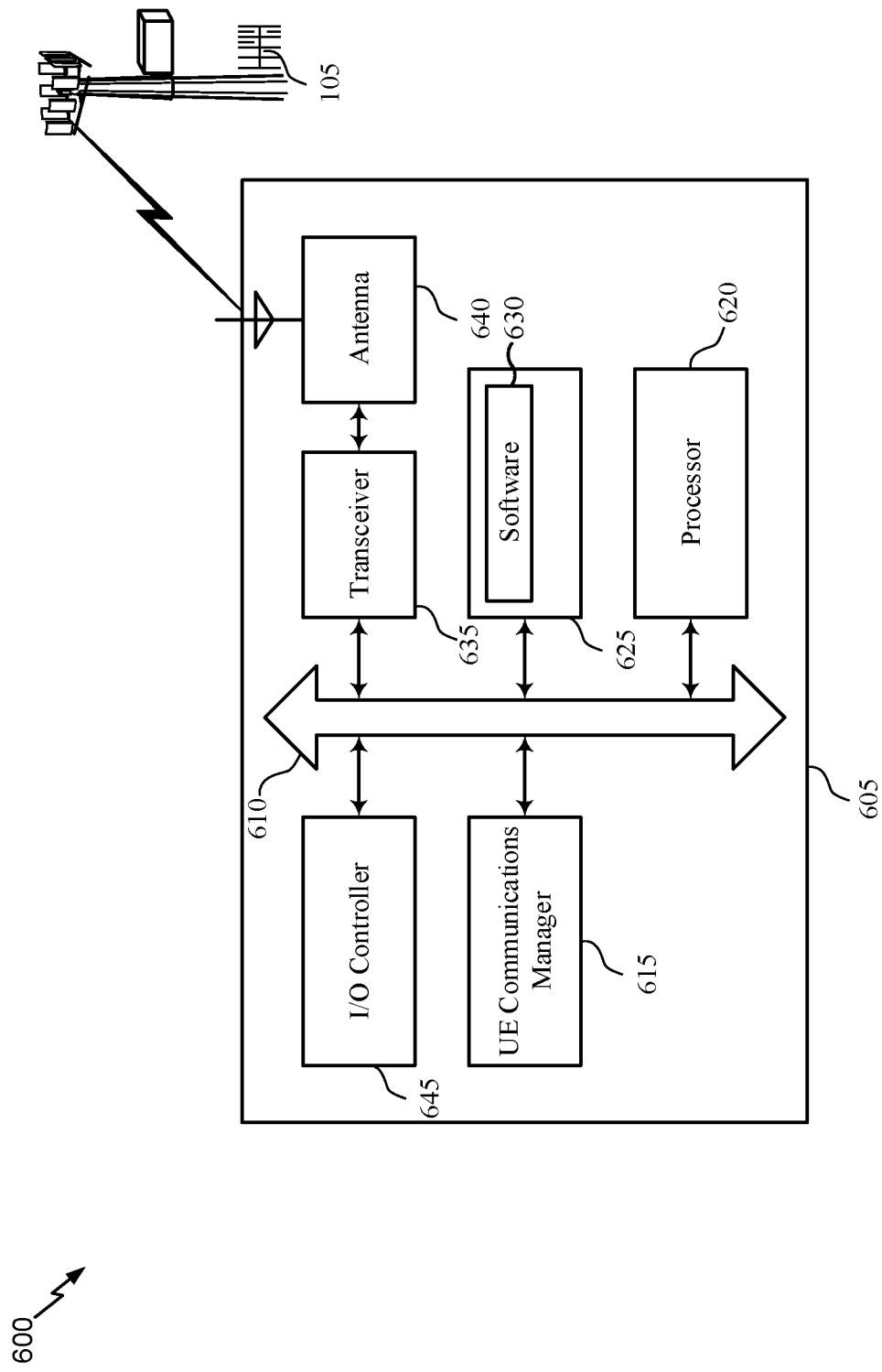
FIG. 6 illustrates a block diagram of a system including a user equipment (UE) that supports partially synchronized access in accordance with aspects of the present disclosure.

FIG. 6 shows a diagram of a system 600 including a device 605 that supports partially synchronized access in accordance with various aspects of the present disclosure. Device 605 may be an example of or include the components of a UE 115, a wireless device 305, or a wireless device 405, as described above with reference to FIGS. 1-4. Device 605 may include components for bi-directional voice and data communications including components for transmitting and receiving communications, including UE communications manager 615, processor 620, memory 625, software 630, transceiver 635, antenna 640, and I/O controller 645. These components may communicate electronically via one or more buses (e.g., bus 610). Device 605 may communicate wirelessly with one or more base stations 105.

Processor 620 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 620 may be configured to operate a memory array using a memory controller. In other cases, a memory controller may be integrated into processor 620. Processor 620 may be configured to execute computer-readable instructions stored in a memory to perform various functions (e.g., functions or tasks supporting partially synchronized access).

Memory 625 may include random access memory (RAM) and read only memory (ROM). The memory 625 may store computer-readable, computer-executable software 630 including instructions that, when executed by one or more processors, cause the one or more processors to perform various functions described herein. In some cases, the memory 625 may contain, among other things, a basic input/output system (BIOS) which may control basic hardware and/or software operation such as the interaction with peripheral components or devices.

Software 630 may include code to implement aspects of the present disclosure, including code to support partially synchronized access. Software 630 may be stored in a non-transitory computer-readable medium such as system memory or other memory. In some cases, the software 630 may not be directly executable by the processor but may cause a computer (e.g., when compiled and executed) to perform functions described herein.

Transceiver 635 may communicate bi-directionally, via one or more antennas, wired links, or wireless links as described above. For example, the transceiver 635 may represent a wireless transceiver and may communicate bi-directionally with another wireless transceiver. The transceiver 635 may also include a modem to modulate the packets and provide the modulated packets to the antennas for transmission, and to demodulate packets received from the antennas. In some aspects, transceiver 635 may include a separate transmitter component and receiver component.

In some cases, the wireless device may include a single antenna 640. However, in some cases the device may have more than one antenna 640, which may be capable of concurrently transmitting or receiving multiple wireless transmissions.

I/O controller 645 may manage input and output signals for device 605. I/O controller 645 may also manage peripherals not integrated into device 605. In some cases, I/O controller 645 may represent a physical connection or port to an external peripheral. In some cases, I/O controller 645 may utilize an operating system, such as iOS®, ANDROID®, MS-DOS®, MS-WINDOWS®, OS/2®, UNIX®, LINUX®, or another operating system.

As indicated above, FIG. 6 is provided merely as an example. Other examples are possible and may differ from what was described with regard to FIG. 6.

Figure 7:
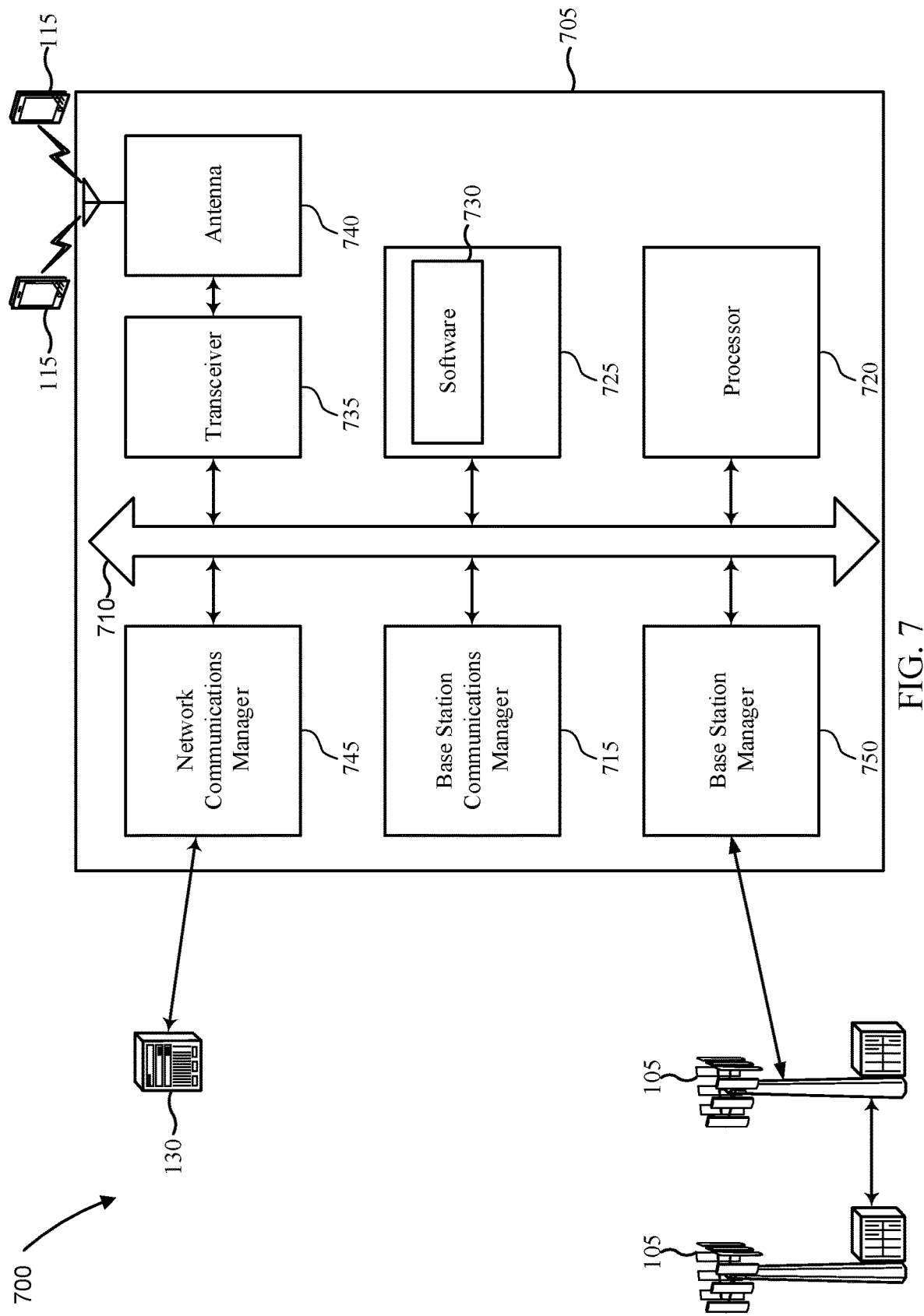
FIG. 7 illustrates a block diagram of a system including a base station that supports partially synchronized access in accordance with aspects of the present disclosure.

FIG. 7 shows a diagram of a system 700 including a device 705 that supports partially synchronized access in accordance with various aspects of the present disclosure. Device 705 may be an example of or include the components of a base station 105, a wireless device 305, or a wireless device 405 as described above, e.g., with reference to FIGS. 1-4. Device 705 may include components for bi-directional voice and data communications including components for transmitting and receiving communications, including base station communications manager 715, processor 720, memory 725, software 730, transceiver 735, antenna 740, network communications manager 745, and base station manager 750. These components may be in electronic communication via one or more buses (e.g., bus 710). Device 705 may communicate wirelessly with one or more UEs 115.

Processor 720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting partially synchronized access).

Memory 725 may include RAM and ROM. The memory 725 may store computer-readable, computer-executable software 730 including instructions that, when executed, cause the processor to perform various functions described herein. In some cases, the memory 725 may contain, among other things, a BIOS which may control basic hardware and/or software operation such as the interaction with peripheral components or devices.

Software 730 may include code to implement aspects of the present disclosure, including code to support partially synchronized access. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some aspects, transceiver 735 may include a separate transmitter component and receiver component.

In some cases, the device 705 may include a single antenna 740. However, in some cases the device 705 may have more than one antenna 740, which may be capable of concurrently transmitting or receiving multiple wireless transmissions.

Network communications manager 745 may manage communications with the core network (e.g., via one or more wired backhaul links). For example, the network communications manager 745 may manage the transfer of data communications for client devices, such as one or more UEs 115.

Base station manager 750 may manage communications with other base stations 105, and may include a controller or scheduler for controlling communications with UEs 115 in cooperation with other base stations 105. For example, the base station manager 750 may coordinate scheduling for transmissions to UEs 115 for various interference mitigation techniques, such as beamforming or joint transmission. In some examples, base station manager 750 may provide an X2 interface within an LTE/LTE-A wireless communication network technology to provide communication between base stations 105. Base station manager 750 may provide other interfaces compatible with NR or other next-generation wireless communication network technology.

As indicated above, FIG. 7 is provided merely as an example. Other examples are possible and may differ from what was described with regard to FIG. 7.

Figure 8:
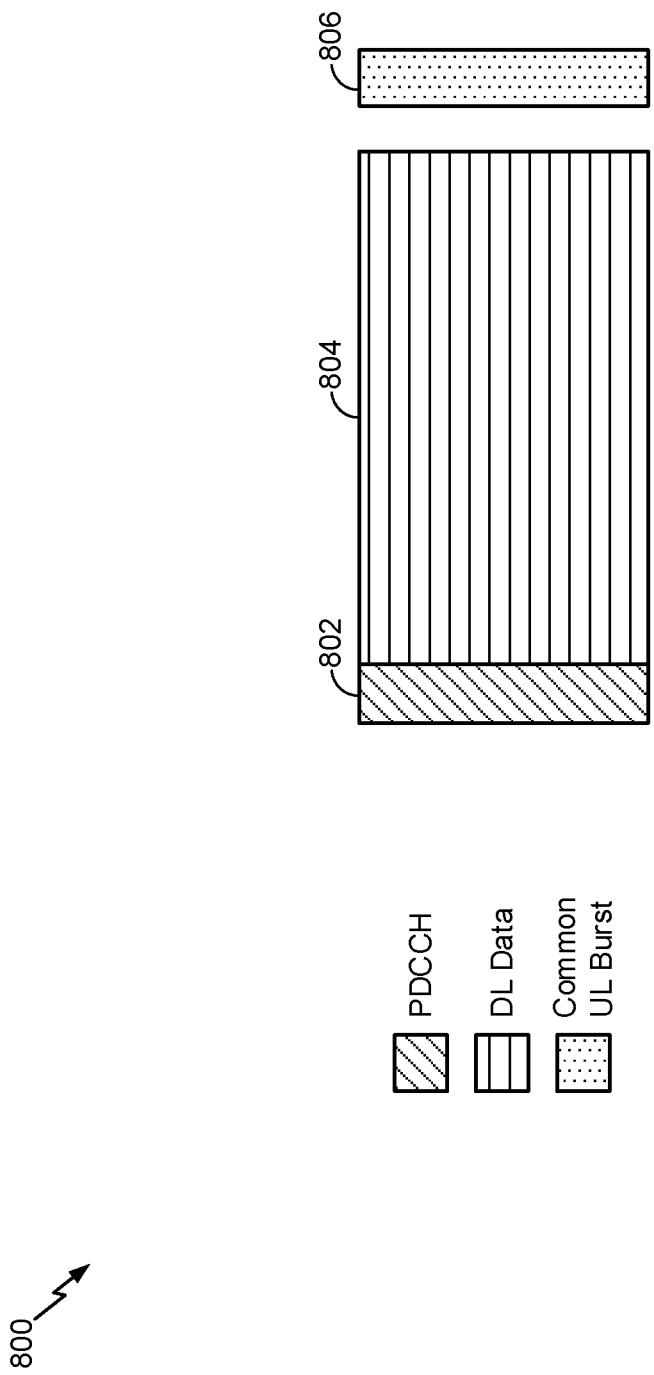
FIG. 8 illustrates an example of a downlink (DL)-centric subframe that supports partially synchronized access in accordance with aspects of the present disclosure.

FIG. 8 is a diagram 800 showing an example of a DL-centric subframe. The DL-centric subframe may include a control portion 802. The control portion 802 may exist in the initial or beginning portion of the DL-centric subframe. The control portion 802 may include various scheduling information and/or control information corresponding to various portions of the DL-centric subframe. In some configurations, the control portion 802 may be a physical DL control channel (PDCCH), as indicated in FIG. 8. The DL-centric subframe may also include a DL data portion 804. The DL data portion 804 may sometimes be referred to as the payload of the DL-centric subframe. The DL data portion 804 may include the communication resources utilized to communicate DL data from the scheduling entity (e.g., a UE or a base station (BS)) to the subordinate entity (e.g., a UE). In some configurations, the DL data portion 804 may be a physical DL shared channel (PDSCH).

The DL-centric subframe may also include a common UL portion 806. The common UL portion 806 may sometimes be referred to as an UL burst, a common UL burst, and/or various other suitable terms. The common UL portion 806 may include feedback information corresponding to various other portions of the DL-centric subframe. For example, the common UL portion 806 may include feedback information corresponding to the control portion 802. Non-limiting examples of feedback information may include an ACK signal, a NACK signal, a HARQ indicator, and/or various other suitable types of information. The common UL portion 806 may include additional or alternative information, such as information pertaining to random access channel (RACH) procedures, scheduling requests, and various other suitable types of information. As illustrated in FIG. 8, the end of the DL data portion 804 may be separated in time from the beginning of the common UL portion 806. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric subframe and alternative structures having similar features may exist without necessarily deviating from the aspects described herein.

As indicated above, FIG. 8 is provided merely as an example. Other examples are possible and may differ from what was described with regard to FIG. 8.

Figure 9:
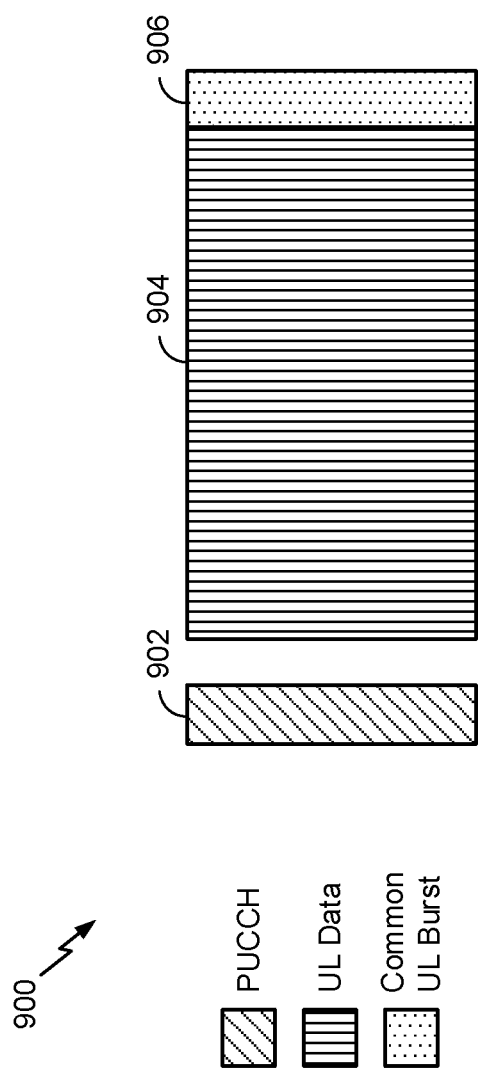
FIG. 9 illustrates an example an uplink (UL)-centric subframe that supports partially synchronized access in accordance with aspects of the present disclosure.

FIG. 9 is a diagram 900 showing an example of an UL-centric subframe. The UL-centric subframe may include a control portion 902. The control portion 902 may exist in the initial or beginning portion of the UL-centric subframe. The control portion 902 in FIG. 9 may be similar to the control portion 802 described above with reference to FIG. 8. The UL-centric subframe may also include an UL data portion 904. The UL data portion 904 may sometimes be referred to as the payload of the UL-centric subframe. The UL portion may refer to the communication resources utilized to communicate UL data from the subordinate entity (e.g., a UE) to the scheduling entity (e.g., a UE or a BS). In some configurations, the control portion 902 may be a physical UL shared channel (PUSCH).

As illustrated in FIG. 9, the end of the control portion 902 may be separated in time from the beginning of the UL data portion 904. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 906. The common UL portion 906 in FIG. 9 may be similar to the common UL portion 806 described above with reference to FIG. 8. The common UL portion 906 may additionally, or alternatively, include information pertaining to a channel quality indicator (CQI), sounding reference signals (SRSs), and various other suitable types of information. The foregoing is merely one example of an UL-centric subframe and alternative structures having similar features may exist without necessarily deviating from the aspects described herein.

In one example, a frame may include both UL centric subframes and DL centric subframes. In this example, the ratio of UL centric subframes to DL subframes in a frame may be dynamically adjusted based at least in part on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

As indicated above, FIG. 9 is provided merely as an example. Other examples are possible and may differ from what was described with regard to FIG. 9.

Figure 10:
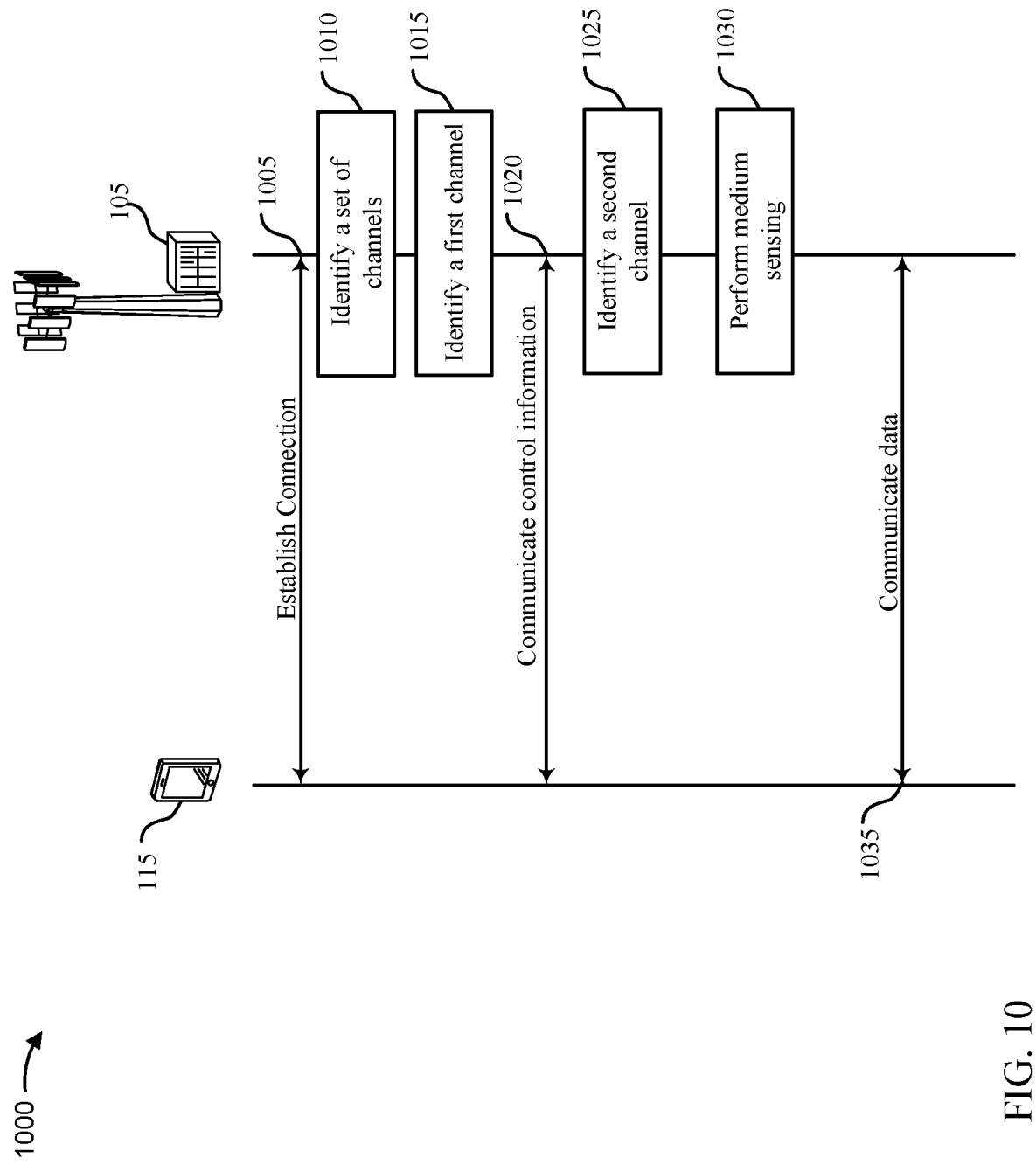
FIG. 10 illustrates an example a process flow that supports partially synchronized access in accordance with aspects of the present disclosure.

FIG. 10 illustrates an example of a flow diagram 1000 between a UE 115 and a base station 105 using FDM for medium access and supporting medium sharing with fully or partially synchronized network operators in accordance with aspects of the present disclosure. UE 115 and base station 105 may be examples of the corresponding entities described with reference to FIGS. 1-2.

At reference number 1005, a wireless connection may be established between UE 115 and base station 105. Base station 105 and UE 115 may associated with a same network operator. The wireless connection may include or be preceded by the exchange of control signaling, such as access or synchronization signaling.

At reference number 1010, base station 105 may identify a set of channels in a shared radio frequency spectrum band shared by a set of network operators. In some examples, UE 115 may identify the set of channels.

At reference number 1015, base station 105 may identify a first channel in the set of channels. For example, a first network operator, of the set of network operators, may have priority to use the first channel over a second network operator of the set of network operators. In some aspects, the first channel may be a primary channel for the first network operator on which the first network operator (e.g., associated with base station 105) may transmit a downlink reference signal (DRS)/UL RACH signal without performing an LBT procedure. For example, the first network operator may transmit the DRS/UL RACH signal during an A-INT period, as described herein. In some aspects, the first channel may be a primary channel for the first network operator on which the first network operator is assigned the highest priority (i.e., a higher priority than the second network operator). For example, the first network operator may access the first channel without contention during a G-INT period subsequent to the A-INT period. In some aspects, the first channel may be a secondary channel for the first network operator on which the first network operator is assigned a higher priority than the second network operator. For example, the first network operator may access the first channel after one or more other network operators with a higher priority for the first channel decline to use the first channel, such as during an O-INT period subsequent to a G-INT period.

At reference number 1020, base station 105 may communicate control information with UE 115. For example, base station 105 may communicate a DRS/UL RACH signal during an A-INT on the first channel. In some aspects, the control information may include synchronization information, system information, paging information, random access information, or a combination thereof. In some examples, UE 115 may communicate control information to base station 105.

At reference number 1025, base station 105 may identify a second channel in the set of channels. For example, base station 105 may identify the second channel where the second network operator has a priority to use the second channel over the first network operator.

At reference number 1030, base station 105 may perform medium sensing procedures for measuring communications from other network operators, as described herein. For example, base station 105 may determine that the second channel is available for utilization based at least in part on higher priority network operators (e.g., the second network operator) failing to use the second channel or indicating an intent to use the second channel. Similarly, base station 105 may use the first channel or transmit an indication of an intent to use the first channel. In some aspects, base station 105 may listen for a preamble, an RTS/CTS exchange, energy, and/or the like associated with the other network operators to perform medium sensing for the second channel.

At reference number 1035, base station 105 may communicate data with UE 115. For example, base station 105 may determine to utilize the first channel for which the first network operator is associated with a higher priority than the second network operator without performing an LBT procedure. Additionally, or alternatively, base station 105 may perform an LBT procedure to determine that the second network operator is not utilizing and/or does not intend to utilize the second channel, and may determine to use the second channel for communicating data. In this case, base station 105 and UE 115 may communicate using the second channel.

As indicated above, FIG. 10 is provided merely as an example. Other examples are possible and may differ from what was described with regard to FIG. 10. For example, the specific order or hierarchy of operations described with regard to FIG. 10 is an illustration of an example. Based upon design preferences, the specific order or hierarchy of operations may be rearranged. Further, some operations may be combined or omitted, or additional operations may be included.

Figure 11A:
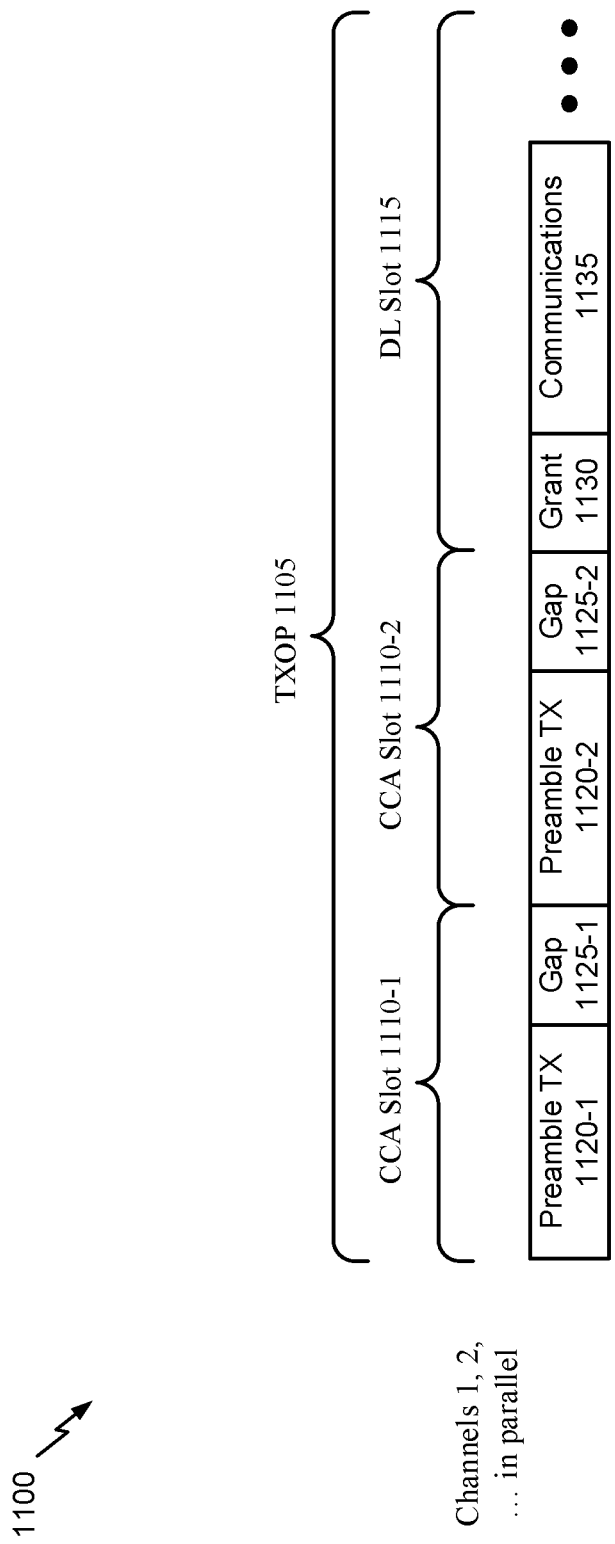
FIGS. 11A and 11B illustrate an example of partially synchronized access in accordance with aspects of the present disclosure.
Figure 11B:
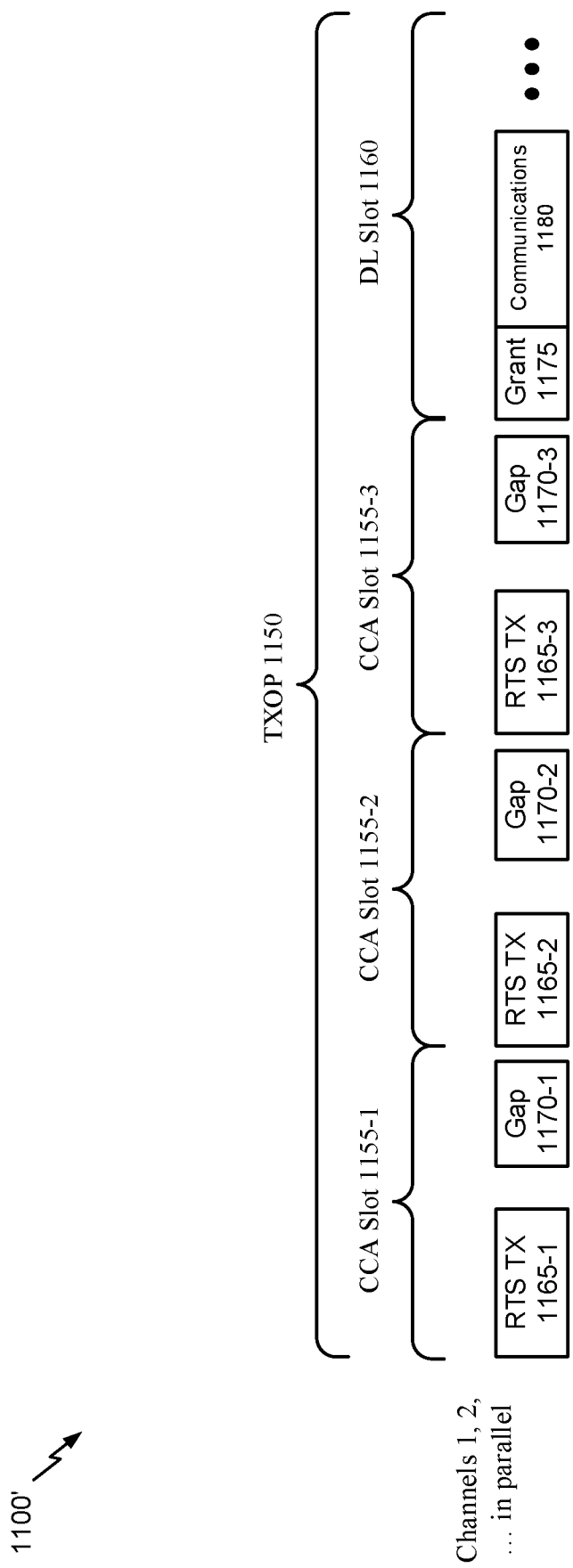

FIGS. 11A and 11B illustrate an example of timing diagrams 1100 and 1100', respectively, for partially synchronized access. As shown in FIG. 11A, example timing diagram 1100 includes a transmission opportunity (TXOP) 1105 for a first channel, a second channel, . . . ; a set of CCA slots 1110-1 and 1110-2; and a DL slot 1115.

Base stations (e.g., base stations or UEs) associated with a first network operator, a second network operator, and a third network operator (e.g., which may correspond to base station 105 of FIG. 1, 2, 6, 7, or 10; UE 115 of FIG. 1, 2, 7, or 10; wireless device 305 of FIG. 3; wireless device 405 of FIG. 4; device 605 of FIG. 6; device 705 of FIG. 7; or another device described herein) may identify a set of channels, such as a first channel, a second channel, . . . , etc. The first network operator is associated with a highest priority on the first channel, the second network operator is associated with a next highest priority on the first channel, and the third network operator is associated with a next highest priority on the first channel. In the example illustrated in FIGS. 11A and 11B, the base stations may transmit and/or listen on multiple channels concurrently. Thus, although FIGS. 11A and 11B are described in terms of the first channel, the description of FIGS. 11A and 11B is applicable to other channels, such as the second channel, . . . , etc. The base stations may transmit and/or listen on multiple channels concurrently when, for example, the multiple channels do not share a common frequency band, such as in an NR-SS system with frequency division multiplexing (FDM).

As further shown in FIG. 11A, CCA slot 1110-1 may include preamble transmission period 1120-1 and gap period 1125-1. For example, a first base station associated with the first network operator may transmit a preamble during preamble transmission period 1120-1 to indicate that the first base station is to use the first channel. In another example, on a second channel for which the second network operator has the highest priority on the channel, a second base station associated with the second network operator may transmit a preamble during preamble transmission period 1120-1 to indicate that the second base station is to use the second channel. In another example, on a third channel for which the third network operator has the highest priority on the channel, a third base station associated with the third network operator may transmit a preamble during preamble transmission period 1120-1 to indicate that the third base station is to use the third channel. In this way, the highest priority network operator for a particular channel can indicate an intent to use the particular channel. Based at least in part on each network operator being associated with a highest priority on at least one channel, a likelihood that a network operator fails to receive network resources is reduced, thereby improving network performance relative to another technique for medium sensing.

As further shown with regard to FIG. 11A, the second base station and the third base station may try to detect a preamble transmitted by the first base station using the first channel during first gap period 1125-1. First gap period 1125-1 may be selected to be of a particular threshold period of time to permit the second base station and the third base station to detect and/or process a preamble from the first base station, to account for a timing offset across multiple network operators that are not synchronized (e.g., the first network operator, the second network operator, the third network operator, etc.), and/or the like. Based at least in part on failing to detect a preamble transmitted by the first base station (e.g., based at least in part on the first base station not transmitting a preamble as a result of not intending to use the first channel during TXOP 1105), the second and third base stations may determine that the first base station is not intending to use and/or is not using the first channel for TXOP 1105.

As further shown with regard to FIG. 11A, based at least in part on the second network operator having a next highest priority on the first channel, the second base station may transmit a preamble during preamble transmission period 1120-2 of CCA slot 1110-2 to indicate an intent to use the first channel and/or to use the first channel during TXOP 1105. The third base station may attempt to detect a preamble from the second base station during gap period 1125-2. Based at least in part on failing to detect the preamble from the second base station during gap period 1125-2, the third base station may determine that the second base station does not intend to use and/or is not using the first channel during TXOP 1105. Based at least in part on the third network operator being assigned the next highest priority on the first channel, the third base station may determine to utilize the first channel for communication during TXOP 1105.

As further shown with regard to FIG. 11A, the third base station may utilize DL slot 1115 of TXOP 1105. For example, the third base station may transmit a grant during grant period 1130, and may transmit a PDSCH during communication period 1135. In this way, the third network operator (e.g., the third base station) is granted use of the third channel during TXOP 1105 (e.g., a channel for which the third network operator is associated with a lower priority than one or more other network operators, such as the first network operator or the second network operator), such as to transmit control information, to transmit data, and/or the like. Based at least in part on the third network operator being granted use of the third channel during TXOP 1105 (e.g., based at least in part on a UE or a base station associated with the third network operator listening for communications corresponding to a preamble during CCA slots 1110), the third network operator may use the third channel for communication (e.g., a UE or a base station associated with the third network operator may communicate with a wireless node, such as another base station or another UE, associated with the third network operator).

FIG. 11B is an illustration of a similar timing diagram 1100' of a first channel where network operators can transmit and/or listen on the set of channels (e.g., a first channel, a second channel, a third channel, etc.) concurrently. Timing diagram 1100' includes a TXOP 1150 for the first channel, which includes CCA slots 1155-1, 1155-2, and 1155-3 and DL slot 1160. The first network operator is associated with a highest priority on the first channel, the second network operator is associated with a next highest priority on the first channel, and the third network operator is associated with a next highest priority on the first channel.

As further shown in FIG. 11B, CCA slot 1155-1 is reserved for the first network operator (e.g., the first base station) to transmit an RTS message. For example, the first base station may transmit the RTS message to a first UE of a group of UEs (e.g., which may correspond to UE 115 of FIG. 1, 2, 7, or 10; wireless device 305 of FIG. 3; wireless device 405 of FIG. 4; device 605 of FIG. 6; device 705 of FIG. 7, or another device described herein) during RTS transmission period 1165-1 of CCA slot 1165-1. During a first gap period 1170-1, the group of base stations (e.g., the first, second, third, etc. base stations) may attempt to detect the RTS/CTS exchange (e.g., a CTS response from the first UE associated with the first network operator). CCA slot 1155-2 is reserved for the second network operator (e.g., the second base station) to transmit an RTS message. Based at least in part on failing to detect the RTS/CTS exchange, the group of base stations may determine that the first network operator is not going to use the first channel during TXOP 1150.

As further shown in FIG. 11B, the second base station may transmit the RTS message to a second UE of the group of UEs during RTS transmission period 1165-2 of CCA slot 1155-2. During a second gap period 1170-2, the group of base stations may attempt to detect the RTS/CTS exchange (e.g., a CTS response from the second UE associated with the second network operator). Based at least in part on failing to detect the RTS/CTS exchange, the group of base stations may determine that the second network operator is not going to use the first channel during TXOP 1150.

As further shown in FIG. 11B, the third base station may transmit the RTS message to a third UE of the group of UEs during RTS transmission period 1165-3 of CCA slot 1155-3. During the third gap period 1170-3, the group of base stations may attempt to detect the RTS/CTS exchange (e.g., a CTS response from the third UE associated with the third network operator). Based at least in part on the third base station detecting a CTS response the third network operator may determine to use the first channel to communicate during DL slot 1160 of TXOP 1150. The third base station may send a grant during grant period 1175 and a PDSCH during communication period 1180 to communicate on the first channel during TXOP 1150. In this way, the third base station may communicate with a wireless node based at least in part on listening for an RTS/CTS exchange associated with another network operator with a higher priority than the third base station for the first channel.

As indicated above, FIGS. 11A and 11B are provided merely as an example. Other examples are possible and may differ from what was described with regard to FIGS. 11A and 11B. For example, the coordination frameworks described with reference to FIGS. 11A and 11B are for illustration purposes only. The number, duration, and location of CCA slots 1110 and/or RTS/CTS exchange periods 1155 may be different. Also, the quantity of network operators and priorities thereof may be different.

Figure 12A:
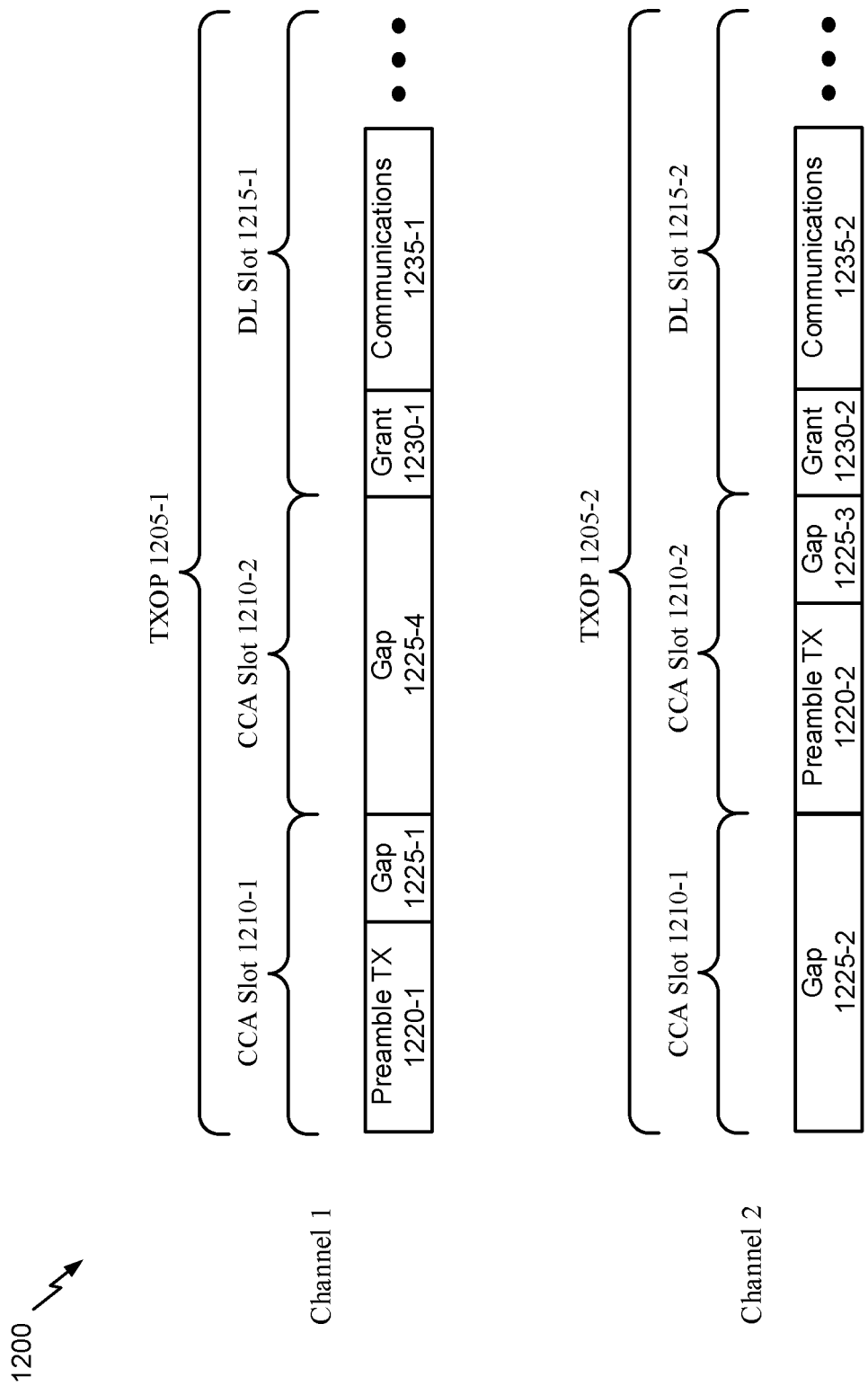
FIGS. 12A and 12B illustrate an example of partially synchronized access in accordance with aspects of the present disclosure.
Figure 12B:
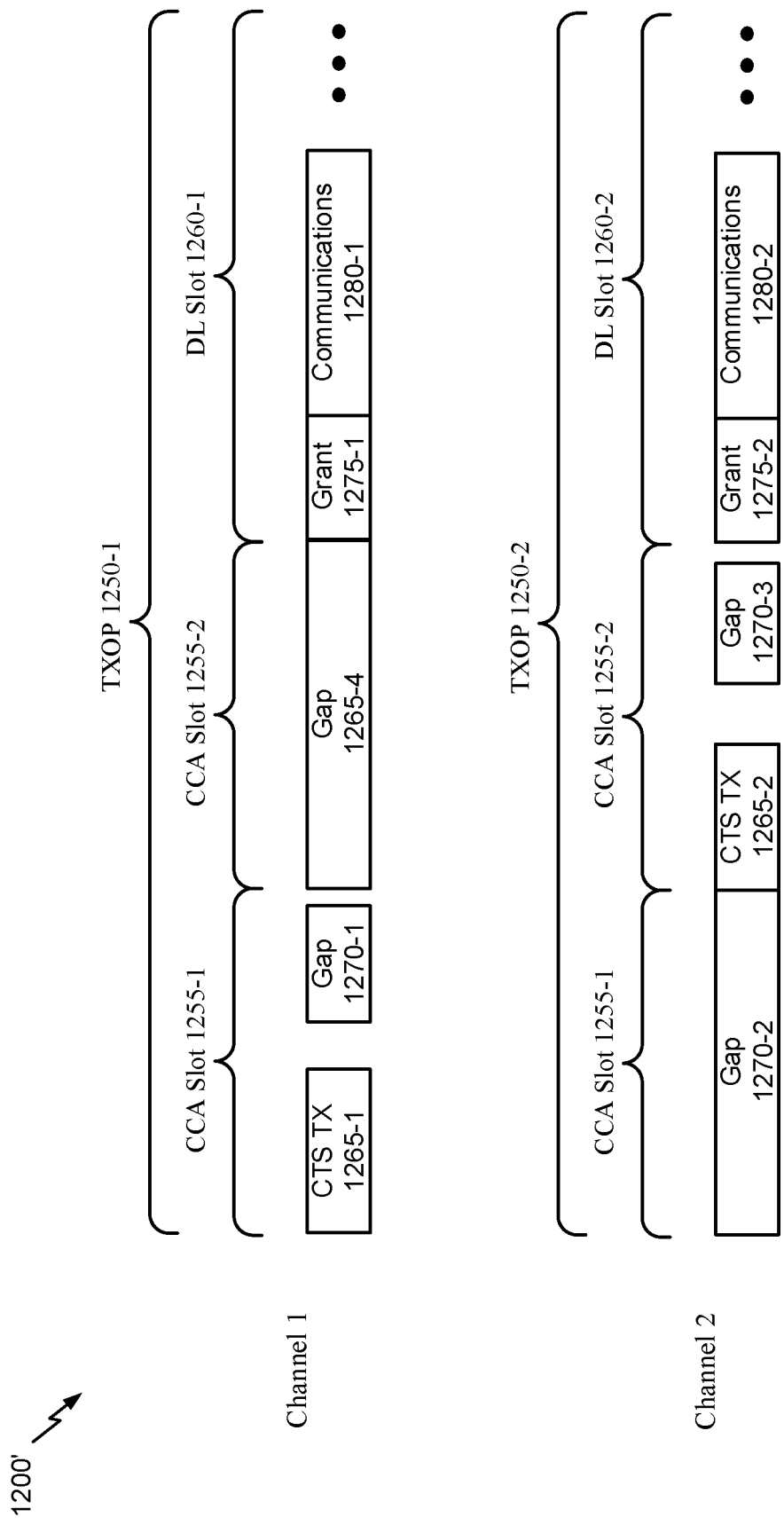

FIGS. 12A and 12B illustrate an example of timing diagrams 1200 and 1200', respectively, for partially synchronized access. As shown in FIG. 12A, example timing diagram 1200 includes a transmission opportunity (TXOP) 1205-1 for a first channel and 1205-2 for a second channel; a set of CCA slots 1210-1 and 1210-2; and a set of DL slots 1215-1 on the first channel and 1215-2 on the second channel.

Base stations associated with a first network operator and a second network operator (e.g., which may correspond to base station 105 of FIG. 1, 2, 6, 7, or 10; wireless device 305 of FIG. 3; wireless device 405 of FIG. 4; device 605 of FIG. 6; or device 705 of FIG. 7) may identify the first channel and the second channel. The first network operator is associated with a highest priority on the first channel and the second network operator is associated with a next highest priority on the first channel. The second network operator is associated with a highest priority on the second channel and the first network operator is associated with a next highest priority on the second channel. In the example illustrated in FIGS. 12A and 12B, the base stations may not transmit and/or listen on multiple channels concurrently. This may occur, for example, when the first channel and the second channel share a common frequency band.

With regard to FIGS. 12A and 12B, although the first network operator and the second network operator may have independent timing, during an A-INT for the first network operator on the first channel, the second network operator may be silent on the second channel. Similarly, during an A-INT for the second network operator on the second channel, the first network operator may be silent on the first channel. In some other examples, for example when the second network operator does not need to monitor the A-INT for the first network operator, the second network operator may transmit on the second channel while the first operator transmits the A-INT on the first channel.

As further shown in FIG. 12A, on the first channel during CCA slot 1210-1, preamble transmission period 1220-1 may be reserved for the first network operator. For example, the first base station associated with the first network operator may transmit a preamble during preamble transmission period 1220-1. On the first channel, the second base station associated with the second network operator may attempt to detect a preamble from the first base station during gap period 1225-1. Similarly, on the second channel during CCA slot 1210-1, gap period 1225-2 may be reserved to permit the second base station to listen on the first channel for a preamble from the first base station (e.g., as a result of the network operators not being able to listen on the first channel and transmit on the second channel concurrently).

As further shown in FIG. 12A, on the second channel during CCA slot 1210-2, preamble transmission period 1220-2 may be reserved for the second network operator. For example, the second base station associated with the second network operator may transmit a preamble during preamble transmission period 1220-2. On the second channel, the first base station associated with the first network operator may attempt to detect a preamble from the second base station during gap period 1225-3. Similarly, on the first channel during CCA slot 1210-2, a second gap period 1225-4 may be reserved to permit the first base station to listen on the second channel for a preamble from the second base station.

With regard to FIG. 12A, when the first base station transmits a preamble during preamble transmission period 1220-1 (and the second base station detects the preamble during gap period 1225-1) and when the second base station does not transmit a preamble during preamble transmission period 1220-2 (and the first base station does not detect a preamble during gap period 1225-3), the first base station may use at least one of the first channel or the second channel for communication. In this case, during DL slots 1215-1 and 1215-2, the first network operator (e.g., the first base station) may use grant periods 1230-1 and 1230-2 to transmit grants and communication periods 1235-1 and 1235-2 to communicate (e.g., to communicate data) using the first channel and the second channel.

As shown in FIG. 12B, example timing diagram 1200' includes a transmission opportunity (TXOP) 1250 for the first channel and the second channel; a set of CCA slots 1255-1 and 1255-2; and a set of DL slot 1260-1 and 1260-2.

As further shown in FIG. 12B, on the first channel during CCA slot 1255-1, RTS transmission period 1265-1 may be reserved for the first network operator. For example, the first base station associated with the first network operator may transmit an RTS during first RTS transmission 1265-1. On the first channel, the second base station associated with the second network operator may attempt to detect an RTS/CTS exchange of the first base station during gap period 1270-1 (e.g., detect receipt of a CTS response). Similarly, on the second channel during the CCA slot 1255-1, a second gap period 1270-2 may be reserved to permit the second base station to listen on the first channel for the RTS/CTS exchange.

As further shown in FIG. 12B, on the second channel during CCA slot 1255-2, RTS transmission period 1265-2 may be reserved for the second network operator. For example, the second base station associated with the second network operator may transmit an RTS during RTS transmission period 1265-2. On the second channel, the first base station associated with the first network operator may attempt to detect an RTS/CTS exchange of the second base station during gap period 1270-3. Similarly, on the first channel during the CCA slot 1255-2, gap period 1265-4 may be reserved to permit the first base station to listen on the second channel for the RTS/CTS exchange.

With regard to FIG. 12B, when the first base station does not transmit an RTS during CCA slot 1255-1 (and/or the first base station and the second base station do not detect a CTS response) and when the second base station transmits an RTS during CCA slot 1255-2 (and the first base station and second base station detect a CTS response), the second base station may determine to use the first channel and/or the second channel for communication. In this case, during DL slots 1260-1 and 1260-2, the second network operator (e.g., the second base station) may use grant periods 1275-1 and 1275-2 to transmit grants and communication periods 1280-1 and 1280-2 to communicate (e.g., to communicate data) using the first channel and the second channel.

As indicated above, FIGS. 12A and 12B are provided merely as an example. Other examples are possible and may differ from what was described with regard to FIGS. 12A and 12B. For example, the coordination frameworks described with reference to FIGS. 12A and 12B are for illustration purposes only. The number, duration, and location of CCA slots 1210 or CCA slots 1255 may be different. Also, the quantity of network operators and priorities thereof may be different.

Figure 13:
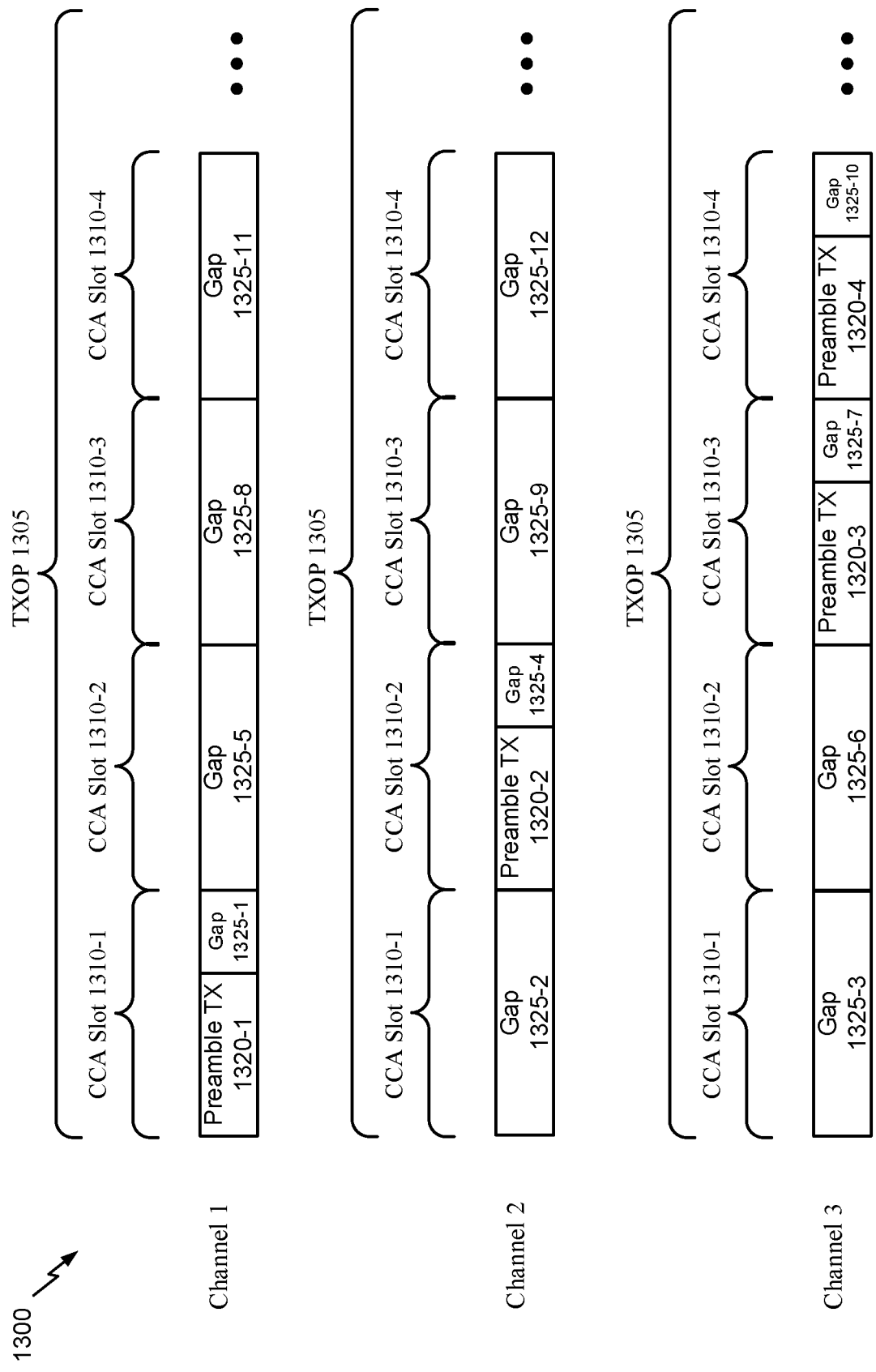
FIG. 13 illustrates an example of partially synchronized access in accordance with aspects of the present disclosure.

FIG. 13 illustrates an example of a timing diagram 1300 for using FDM for medium access and supporting medium sharing with fully or partially synchronized network operators. As shown in FIG. 13, example timing diagram 1300 includes a transmission opportunity (TXOP) 1305 for a first channel, a second channel, and a third channel; and a set of CCA slots 1310-1, 1310-2, and 1310-3.

A group of base stations associated with a first network operator, a second network operator, and a third network operator (e.g., which may correspond to base station 105 of FIG. 1, 2, 6, 7, or 10; wireless device 305 of FIG. 3; wireless device 405 of FIG. 4; device 605 of FIG. 6; or device 705 of FIG. 7) may identify the first channel, the second channel, and the third channel. The first network operator is associated with a highest priority on the first channel, the second network operator is associated with a next highest priority on the first channel, and the third network operator is associated with a next highest priority on the first channel. Similarly, the second network operator is associated with a highest priority on the second channel and the third network operator is associated with a highest priority on the third channel. In the example illustrated in FIG. 13, the base stations may not transmit and/or listen on multiple channels concurrently. This may occur, for example, when the first channel, the second channel, and the third channel share a common frequency band.

As further shown in FIG. 13, on the first channel during CCA slot 1310-1, preamble transmission period 1320-1 may be reserved for the first network operator (i.e., a first base station associated with the first network operator) to transmit a preamble and gap period 1325-1 for the second network operator (i.e., a second base station associated with the second network operator) and the third network operator (i.e., a third base station associated with the third network operator) to detect the preamble based at least in part on the first network operator having the highest priority on the first channel. As shown, during CCA slot 1310-1 and on the second channel and the third channel, gap period 1325-2 and gap period 1325-3, respectively, may be reserved to permit the second base station and the third base station to listen on the first channel for the preamble from the first base station. Assume that the first base station associated with the first network operator transmits a preamble during preamble transmission period 1320-1, which is detected by the second base station and the third base station during gap period 1325-1. In this case, the group of base stations determine that the first network operator is to use the first channel for communication during TXOP 1305, and may transfer to the second channel to determine use of the second channel for TXOP 1305.

As further shown in FIG. 13, on the second channel during CCA slot 1310-2, preamble transmission period 1320-2 may be reserved for the second network operator to transmit a preamble and gap period 1325-4 may be reserved for the first network operator and the third network operator to detect the preamble. As shown, during CCA slot 1310-2 and on the first channel and the third channel, gap period 1325-5 and gap period 1325-6, respectively, may be reserved to permit the first base station and the third base station to listen on the second channel for the preamble from the second base station. Assume that the second base station associated with the second network operator transmits a preamble during preamble transmission period 1320-1, which is detected by the first base station and the second base station during gap period 1325-4. In this case, the group of base stations determine that the second network operator is to use the second channel for communication during TXOP 1305, and may transfer to the third channel to determine use of the third channel for TXOP 1305.

As further shown in FIG. 13, on the third channel during CCA slot 1310-3, preamble transmission period 1320-3 may be reserved for the third network operator to transmit a preamble and gap period 1325-7 may be reserved for the first network operator and the second network operator to detect the preamble. As shown, during CCA slot 1310-3 and on the first channel and the second channel, gap period 1325-8 and gap period 1325-9, respectively, may be reserved to permit the first base station and the second base station to listen on the third channel for a preamble from the third base station. Assume that the third base station associated with the third network operator does not transmit a preamble during preamble transmission period 1320-3, and, as a result, a preamble is not detected by the first base station and the second base station during gap period 1325-7. In this case, the group of base stations determine that the third network operator is not to use the third channel for communication during TXOP 1305, and may remain on the third channel to permit a next highest priority network operator (e.g., the first network operator) to transmit a preamble to indicate an intent to use and/or to use the third channel for communication during TXOP 1305.

As further shown in FIG. 13, on the third channel during CCA slot 1310-4, preamble transmission period 1320-4 may be reserved for the first network operator to transmit a preamble, which has the next highest priority on the third channel after the third network operator. Gap period 1325-10 may be reserved for the second base station and the third base station to detect the preamble. As shown, during CCA slot 1310-4 and on the first channel and the second channel, gap period 1325-11 and gap period 1325-12, respectively, may be reserved to permit the second base station and the third base station to listen on the third channel for the preamble from the first base station. Assume that the first base station associated with the first network operator transmits a preamble during preamble transmission period 1320-4, which is detected by the second base station and the third base station during gap period 1325-10. In this case, the group of base stations determine that the first network operator is to use the third channel for communication during TXOP 1305.

As indicated above, FIG. 13 is provided merely as an example. Other examples are possible and may differ from what was described with regard to FIG. 13. For example, the coordination framework described with reference to FIG. 13 is for illustration purposes only. The number, duration, and location of CCA slots 1310 may be different. Also, the quantity of network operators and priorities thereof may be different.

Figure 14:
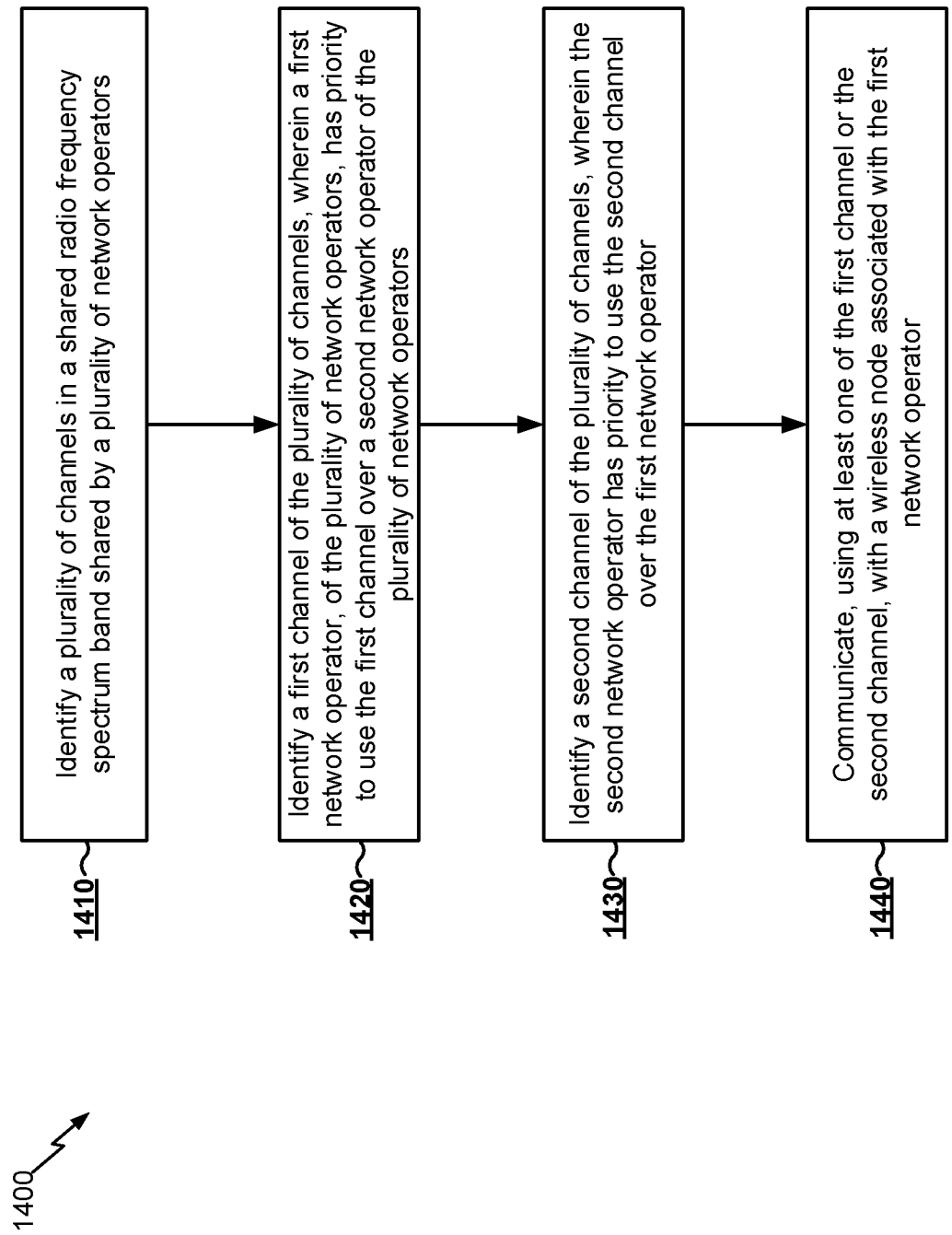
FIG. 14 illustrates a method for partially synchronized access in accordance with aspects of the present disclosure.

FIG. 14 is a flow chart 1400 of a method of wireless communication. The method may be performed by a base station (e.g., which may correspond to base station 105 of FIG. 1, 2, 6, 7, or 10; wireless device 305 of FIG. 3; wireless device 405 of FIG. 4; device 605 of FIG. 6; device 705 of FIG. 7; or another device or apparatus described herein). Additionally, or alternatively, the method may be performed by a UE (e.g., which may correspond to UE 115 of FIG. 1, 2, 7, or 10; wireless device 305 of FIG. 3, wireless device 405 of FIG. 4; device 605 of FIG. 6; device 705 of FIG. 7; or another device or apparatus described herein). For example, the operations of flow chart 1400 may be performed by a communications manager as described with reference to FIGS. 3 through 7.

At 1410, the base station may identify a plurality of channels in a shared radio frequency spectrum band shared by a plurality of network operators. For example, the base station may identify a plurality of channels associated with a plurality of different frequency bands. Additionally, or alternatively, the base station may identify a plurality of channels associated with one or more common frequency bands. In some aspects, the base station may identify the plurality of channels based at least in part on receiving information from another device, such as a UE. In some aspects, the base station may identify a plurality of priorities for the plurality of channels. For example, the base station may determine a priority of a network operator, of the plurality of network operators, corresponding to the base station for each channel of the plurality of channels.

At 1420, the base station may identify a first channel in the plurality of channels, wherein a first network operator, of the plurality of network operators, has priority to use the first channel over a second network operator of the plurality of network operators. For example, the first channel may be assigned as a primary channel for the first network operator. In some aspects, the priority of the first network operator relative to the second network operator may be negotiated by the plurality of network operators. In some aspects, the priority of the first network operator relative to the second network operator may be autonomously allocated by a device, such as the base station, another base station, a UE, an SAS, a base station controller, and/or the like. In some aspects, the priority of the first network operator relative to the second network operator may be assigned by a network operating entity coordinator. In some aspects, the base station may transmit an SRS signal during an A-INT period and using the first channel. For example, when the base station determines that the network operator corresponding to the UE is a primary network operator for the first channel, the base station may transmit during the A-INT period without contention.

At 1430, the base station may identify a second channel in the plurality of channels, wherein the second network operator has priority to use the second channel over the first network operator. For example, the second channel may be assigned as a secondary channel for the first network operator. In some aspects, the second channel may be assigned as a primary channel for the second network operator. In some aspects, the second channel may be assigned as a secondary channel for the second network operator, a secondary channel for the first network operator, and a primary channel for a third network operator.

In some aspects, the base station may listen for communications associated with one or more other network operators, of the plurality of network operators, during a set of intervals of a TXOP of the second channel. The set of intervals may include a transmission period and a gap period. For example, the base station may listen during a gap period for the second network operator (e.g., a base station associated with the second network operator) to transmit/receive a preamble or an RTS/CTS exchange to indicate an intent to use the second channel. A subset of the set of intervals of the TXOP may be ordered based at least in part on a set of priorities of the plurality of network operators for the second channel. For example, a first interval may be assigned to the second network operator to transmit a preamble and a second interval may be assigned to the first network operator to transmit a preamble if the first interval is not used by the second network operator.

In some aspects, the base station may wait for an interval corresponding to a priority of the first network operator for the second channel, and may listen for the communications associated with the one or more other network operators while waiting. In some aspects, the base station may transmit during a particular interval corresponding to a priority, of the set of priorities, of the first network operator for the second channel. For example, the base station may transmit a preamble during an interval allocated for preamble transmission by the first network operator on the second channel based at least in part on the priority of the first network operator on the second channel. In some aspects, the base station may transmit concurrently with listening. For example, the base station may transmit on a first channel concurrently with listening on a second channel (e.g., when the first channel and the second channel are associated with different frequency bands). In some aspects, the base station may listen during a period when the plurality of network operators are silent on a set of channels of the plurality of channels (e.g., the first channel). For example, the base station may listen on the second channel while the plurality of network operators are silent during a gap period of the first channel. In some aspects, the base station may determine a timing for the second channel during the listening to synchronize with the second channel.

At 1440, the base station may communicate using at least one of the first channel or the second channel, with a wireless node associated with the first network operator. For example, the base station may communicate using the first channel and without waiting for the second network operator to indicate an intention to use the first channel based at least in part on the first network operator having a higher priority than the second network operator for the first channel during a particular TXOP. Similarly, the base station may communicate using the second channel after a period of time allocated for the second network operator to indicate an intent to use the second channel for communications during a particular TXOP.

In some aspects, the base station may communicate control information, such as synchronization information, system information, paging information, random access information, and/or the like. Additionally, or alternatively, the base station may communicate data with the wireless node using at least one of the first channel or the second channel. Additionally, or alternatively, the base station may communicate an indication of an intent to communicate the data with the wireless node. For example, the base station may communicate a preamble or an RTS to indicate that the base station is to utilize the first channel or the second channel to transmit data.

In some aspects, the base station may communicate based at least in part on determining an absence of communications from the one or more network operators during the set of intervals of the TXOP of the second channel. In this case, the base station may communicate during another set of intervals of the TXOP of the second channel. In some aspects, the base station may communicate based at least in part on identifying signaling from another network operator with a higher priority for the second channel, such as the second network operator, indicating that the other network operator will not use the TXOP of the second channel for communicating. In some aspects, the base station may refrain from communicating (e.g., using the second channel) based at least in part on determining a presence of communications from at least one of the one or more other network operators during the set of intervals of the TXOP of the second channel. In some aspects, the base station may refrain from communicating based at least in part on identifying signaling from another network operator with a higher priority for the second channel, such as the second network operator, indicating that the other network operator will use the TXOP of the second channel for communicating.

In some aspects, the base station may communicate to indicate to another network operator, of the plurality of network operators, (e.g., with a lower communication priority than the first network operator, such as the second network operator for the first channel) that communication will occur using at least one of the first channel or the second channel. In some aspects, the base station may communicate to indicate to another network operator, of the plurality of network operators, (e.g., with a lower communication priority than the first network operator, such as the second network operator for the first channel) that communication will not occur using at least one of the first channel or the second channel.

As indicated above, FIG. 14 is provided merely as an example. Other examples are possible and may differ from what was described with regard to FIG. 14. The specific order or hierarchy of blocks in the processes/flow charts disclosed is an illustration of examples of approaches. Based upon design preferences, the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

Figure 15:
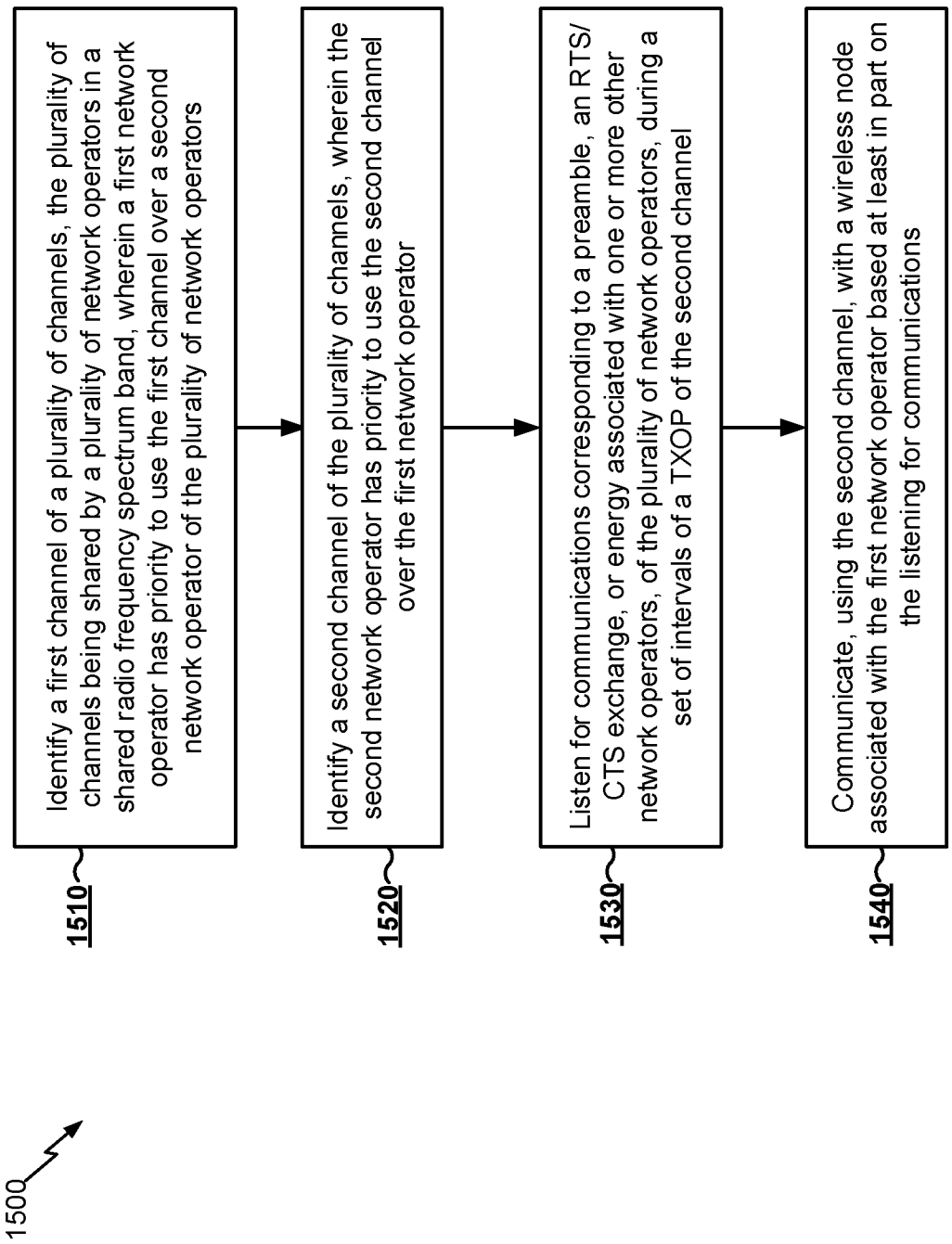
FIG. 15 illustrates a method for partially synchronized access in accordance with aspects of the present disclosure.

FIG. 15 is a flow chart 1500 of a method of wireless communication. The method may be performed by a base station (e.g., which may correspond to base station 105 of FIG. 1, 2, 6, 7, or 10; wireless device 305 of FIG. 3; wireless device 405 of FIG. 4; device 605 of FIG. 6; device 705 of FIG. 7; or another device or apparatus described herein). Additionally, or alternatively, the method may be performed by a UE (e.g., which may correspond to UE 115 of FIG. 1, 2, 7, or 10; wireless device 305 of FIG. 3, wireless device 405 of FIG. 4; device 605 of FIG. 6; device 705 of FIG. 7; or another device or apparatus described herein). For example, the operations of flow chart 1500 may be performed by a communications manager as described with reference to FIGS. 3 through 7.

At 1510, the base station may identify a first channel of a plurality of channels, the plurality of channels being shared by a plurality of network operators in a shared radio frequency spectrum band, wherein a first network operator has priority to use the first channel over a second network operator of the plurality of network operators. For example, the first channel may be assigned as a primary channel for the first network operator. In some aspects, the base station may be associated with the first network operator. In some aspects, the first network operator is assigned as a highest priority, of a plurality of priorities, for the first channel by a network operating entity coordinator.

At 1520, the base station may identify a second channel of the plurality of channels, wherein the second network operator has priority to use the second channel over the first network operator. For example, the second channel may be assigned as a secondary channel for the first network operator. In some aspects, the first channel is associated with a first band and the second channel is associated with a second band, wherein the first band is different from the second band. In some aspects, the first channel and the second channel share a common band.

At 1530, the base station may listen for communications corresponding to a preamble, an RTS/CTS exchange, or energy associated with one or more other network operators, of the plurality of network operators, during a set of intervals of a TXOP of the second channel. In some aspects, a subset of the set of intervals of the TXOP are ordered based at least in part on a set of priorities of the plurality of network operators for the second channel. In some aspects, the base station may wait for an interval corresponding to a priority, of the set of priorities, of the first network operator for the second channel, and may listen for the communications during the waiting for the interval corresponding to the priority of the first network operator for the second channel. In some aspects, the base station may listen for communications associated with a subset of other network operators, of the plurality of network operators, with a higher priority for the second channel than the priority of the first network operator. In some aspects, the base station may listen during a period when the plurality of network operators are silent on a set of channels of the plurality of channels, wherein the set of channels includes the first channel. In some aspects, the set of intervals includes a transmission period and a gap period.

At 1540, the base station may communicate, using the second channel, with a wireless node associated with the first network operator based at least in part on the listening for communications. For example, the base station may communicate using the second channel after a period of time allocated for the second network operator to indicate an intent to use the second channel for communications during a particular TXOP. In some aspects, the base station may transmit during a particular interval corresponding to a priority, of the set of priorities, of the first network operator for the second channel. In some aspects, the base station may determine, based at least in part on the listening, an absence of communications from the one or more other network operators during the set of intervals of the TXOP of the second channel, and may communicate during another set of intervals of the TXOP of the second channel based at least in part on the determining. In some aspects, the base station may communicate data with the wireless node, an indication of an intent to communicate the data with the wireless node, and/or the like.

In some aspects, the base station may identify, based at least in part on the listening, signaling from another network operator, of the one or more other network operators, with a higher priority for the second channel, wherein the signaling indicates that the other network operator will not use another set of intervals of the TXOP of the second channel for communicating, and may communicate during the other set of intervals of the TXOP of the second channel based at least in part on the signaling. In some aspects, the base station may indicate to another network operator, of the plurality of network operators, that communication will occur using the second channel, wherein the other network operator has a lower priority than the first network operator for the second channel. In some aspects, the base station may indicate to another network operator, of the plurality of network operators, that communication will not occur using the first channel, wherein the other network operator has a lower priority than the first network operator for the first channel.

As indicated above, FIG. 15 is provided merely as an example. Other examples are possible and may differ from what was described with regard to FIG. 15. The specific order or hierarchy of blocks in the processes/flow charts disclosed is an illustration of examples of approaches. Based upon design preferences, the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration". Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for".

What is claimed is:

1. A method of wireless communications by a device associated with a first network operator, of a plurality of network operators, comprising:
    identifying a first channel of a plurality of channels, the plurality of channels being shared by the plurality of network operators in a shared radio frequency spectrum band, wherein the first network operator has priority to use the first channel over a second network operator of the plurality of network operators;
    identifying a second channel of the plurality of channels, wherein the second network operator has priority to use the second channel over the first network operator;
    communicating, using the first channel, with a wireless node associated with the first network operator without performing a listen-before-talk (LBT) procedure for the first channel based on the priority of the first network operator for the first channel;
    performing, based on the priority of the second network operator for the second channel relative to priority of the first network operator for the second channel, an LBT procedure to determine that the second network operator is not utilizing the second channel; and
    communicating, using the second channel, with the wireless node associated with the first network operator based at least in part on determining that the second network operator is not utilizing the second channel.

2. The method of claim 1, wherein the first network operator is assigned as a highest priority, of a plurality of priorities, for the first channel by a network operating entity coordinator.

3. The method of claim 1,
    wherein performing the LBT procedure comprises:
        listening, based on the priority of the second network operator for the second channel, for communications corresponding to a preamble, a request to send (RTS)/clear to send (CTS) exchange, or energy associated with one or more other network operators, of the plurality of network operators, during at least one interval of a set of intervals of a transmission opportunity (TXOP) of the second channel, and wherein a subset of the set of intervals of the TXOP are ordered based at least in part on a set of priorities of the plurality of network operators for the second channel.

4. The method of claim 3, wherein the listening comprises:
waiting for an interval corresponding to a priority, of the set of priorities, of the first network operator for the second channel; and
listening for the communications during the waiting for the interval corresponding to the priority of the first network operator for the second channel.

5. The method of claim 3, further comprising:
transmitting during a particular interval corresponding to a priority, of the set of priorities, of the first network operator for the second channel.

6. The method of claim 1, wherein performing the LBT comprises:
listening for communications associated with a subset of other network operators, of the plurality of network operators, with a higher priority for the second channel than the priority of the first network operator.

7. The method of claim 1, wherein performing the LBT comprises:
listening during a period when the plurality of network operators are silent on a set of channels of the plurality of channels,
the set of channels including the first channel.

8. The method of claim 1,
wherein performing the LBT procedure comprises:
listening, based on the priority of the second network operator for the second channel, for communications corresponding to a preamble, a request to send (RTS)/clear to send (CTS) exchange, or energy associated with one or more other network operators, of the plurality of network operators, during at least one interval of a set of intervals of a transmission opportunity (TXOP) of the second channel, and
wherein the set of intervals includes a transmission period and a gap period.

9. The method of claim 1, further comprising:
determining an absence of communications from one or more other network operators, of the plurality of network operators, during a set of intervals of a transmission opportunity (TXOP) of the second channel; and
communicating during another set of intervals of the TXOP of the second channel based at least in part on the determining.

10. The method of claim 9, wherein communicating during the other set of intervals of the TXOP comprises communicating at least one of:
data with the wireless node, or
an indication of an intent to communicate the data with the wireless node.

11. The method of claim 1, further comprising:
identifying, based at least in part on performing the LBT procedure in association with a set of intervals of a transmission opportunity (TXOP) of the second channel, signaling from another network operator, of the plurality of network operators, with a higher priority for the second channel,
the signaling indicating that the other network operator will not use another set of intervals of the TXOP of the second channel for communicating; and
communicating during the other set of intervals of the TXOP of the second channel based at least in part on the signaling.

12. The method of claim 1, further comprising:
indicating to another network operator, of the plurality of network operators, that communication will occur using the second channel,
the other network operator having a lower priority than the first network operator for the second channel.

13. The method of claim 1, wherein the first channel is associated with a first band and the second channel is associated with a second band,
the first band being different from the second band.

14. The method of claim 1, wherein the first channel and the second channel share a common band.

15. A device associated with a first network operator, of a plurality of network operators, comprising:
a memory;
one or more processors coupled to the memory, the memory and the one or more processors configured to:
identify a first channel of a plurality of channels, the plurality of channels being shared by the plurality of network operators in a shared radio frequency spectrum band, wherein the first network operator has priority to use the first channel over a second network operator of the plurality of network operators;
identify a second channel of the plurality of channels, wherein the second network operator has priority to use the second channel over the first network operator;
communicate, using the first channel, with a wireless node associated with the first network operator without performing a listen-before-talk (LBT) procedure for the first channel based on the priority of the first network operator for the first channel;
perform, based on the priority of the second network operator for the second channel relative to priority of the first network operator for the second channel, an LBT procedure to determine that the second network operator is not utilizing the second channel; and
communicate, using the second channel, with the wireless node associated with the first network operator based at least in part on determining that the second network operator is not utilizing the second channel.

16. The device of claim 15, wherein the first network operator is assigned as a highest priority, of a plurality of priorities, for the first channel by a network operating entity coordinator.

17. The device of claim 15,
wherein the one or more processors, when performing the LBT procedure, are configured to:
listen, based on the priority of the second network operator for the second channel, for communications corresponding to a preamble, a request to send (RTS)/clear to send (CTS) exchange, or energy associated with one or more other network operators, of the plurality of network operators, during at least one interval of a set of intervals of a transmission opportunity (TXOP) of the second channel, and
wherein a subset of the set of intervals of the TXOP are ordered based at least in part on a set of priorities of the plurality of network operators for the second channel.

18. The device of claim 17, wherein the one or more processors, when listening, are further configured to:

wait for an interval corresponding to a priority, of the set of priorities, of the first network operator for the second channel; and listen for the communications during the waiting for the interval corresponding to the priority of the first network operator for the second channel.

19. The device of claim 17, wherein the one or more processors are further configured to:
transmit during a particular interval corresponding to a priority, of the set of priorities, of the first network operator for the second channel.

20. An apparatus for wireless communications associated with a first network operator, of a plurality of network operators, comprising:
means for identifying a first channel of a plurality of channels, the plurality of channels being shared by the plurality of network operators in a shared radio frequency spectrum band, wherein the first network operator has priority to use the first channel over a second network operator of the plurality of network operators;
means for communicating, using the first channel, with a wireless node associated with the first network operator without performing a listen-before-talk (LBT) procedure for the first channel based on the priority of the first network operator for the first channel;
means for identifying a second channel of the plurality of channels, wherein the second network operator has priority to use the second channel over the first network operator;
means for performing, based on the priority of the second network operator for the second channel relative to priority of the first network operator for the second channel, an LBT procedure to determine that the second network operator is not utilizing the second channel; and
means for communicating, using the second channel, with the wireless node associated with the first network operator based at least in part on determining that the second network operator is not utilizing the second channel.

21. The apparatus of claim 20, wherein the first network operator is assigned as a highest priority, of a plurality of priorities, for the first channel by a network operating entity coordinator.

22. The apparatus of claim 20,
wherein the means for performing the LBT procedure comprises:
means for listening, based on the priority of the second network operator for the second channel, for communications corresponding to a preamble, a request to send (RTS)/clear to send (CTS) exchange, or energy associated with one or more other network operators, of the plurality of network operators, during at least one interval of a set of intervals of a transmission opportunity (TXOP) of the second channel, and
wherein a subset of the set of intervals of the TXOP are ordered based at least in part on a set of priorities of the plurality of network operators for the second channel.

23. The apparatus of claim 22, wherein the means for listening comprises:
means for waiting for an interval corresponding to a priority, of the set of priorities, of the first network operator for the second channel; and
means for listening for the communications during the waiting for the interval corresponding to the priority of the first network operator for the second channel.

24. The apparatus of claim 22, further comprising:
means for transmitting during a particular interval corresponding to a priority, of the set of priorities, of the first network operator for the second channel.

25. A non-transitory computer-readable medium storing instructions for wireless communication, the instructions comprising:
one or more instructions that, when executed by one or more processors of a device associated with a first network operator, of a plurality of network operators, cause the one or more processors to:
identify a first channel of a plurality of channels, the plurality of channels being shared by the plurality of network operators in a shared radio frequency spectrum band, wherein the first network operator has priority to use the first channel over a second network operator of the plurality of network operators;
identify a second channel of the plurality of channels, wherein the second network operator has priority to use the second channel over the first network operator;
communicate, using the first channel, with a wireless node associated with the first network operator without performing a listen-before-talk (LBT) procedure for the first channel based on the priority of the first network operator for the first channel;
perform, based on the priority of the second network operator for the second channel relative to priority of the first network operator for the second channel, an LBT procedure to determine that the second network operator is not utilizing the second channel; and
communicate, using the second channel, with the wireless node associated with the first network operator based at least in part on determining that the second network operator is not utilizing the second channel.

26. The non-transitory computer-readable medium of claim 25, wherein the first network operator is assigned as a highest priority, of a plurality of priorities, for the first channel by a network operating entity coordinator.

27. The non-transitory computer-readable medium of claim 25,
wherein the one or more instructions, that cause the one or more processors to perform the LBT procedure, cause the one or more processors to:
listen, based on the priority of the second network operator for the second channel, for communications corresponding to a preamble, a request to send (RTS)/clear to send (CTS) exchange, or energy associated with one or more other network operators, of the plurality of network operators, during at least one interval of a set of intervals of a transmission opportunity (TXOP) of the second channel, and
wherein a subset of the set of intervals of the TXOP are ordered based at least in part on a set of priorities of the plurality of network operators for the second channel.

28. The non-transitory computer-readable medium of claim 27, wherein the one or more instructions, that cause the one or more processors to listen, cause the one or more processors to:
wait for an interval corresponding to a priority, of the set of priorities, of the first network operator for the second channel; and
listen for the communications during the waiting for the interval corresponding to the priority of the first network operator for the second channel.

29. The non-transitory computer-readable medium of claim 27, wherein the one or more instructions, when executed by the one or more processors, further cause the one or more processors to:
  transmit during a particular interval corresponding to a priority, of the set of priorities, of the first network operator for the second channel.

* * * * *